United States Patent
Mattera et al.

(10) Patent No.: US 12,406,138 B2
(45) Date of Patent: *Sep. 2, 2025

(54) SYSTEM FOR PROVIDING INTELLIGENT PART OF SPEECH PROCESSING OF COMPLEX NATURAL LANGUAGE

(71) Applicant: UKG INC., Weston, FL (US)

(72) Inventors: Michael L. Mattera, Coral Springs, FL (US); John A. Maliani, Pembroke Pines, FL (US); Robert L Vanderwall, Weston, FL (US); Dionny Santiago, Weston, FL (US); Brian R. Muras, Weston, FL (US); Keith A. Briggs, Coral Springs, FL (US); David Adamo, Sunrise, FL (US); Tariq King, Pembroke Pines, FL (US)

(73) Assignee: UKG INC., Weston, FL (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/088,411

(22) Filed: Dec. 23, 2022

(65) Prior Publication Data

US 2023/0132002 A1   Apr. 27, 2023

Related U.S. Application Data

(63) Continuation of application No. 16/827,089, filed on Mar. 23, 2020, now Pat. No. 11,537,793, which is a
(Continued)

(51) Int. Cl.
*G06F 40/253* (2020.01)
*G06F 40/242* (2020.01)
*G06F 40/284* (2020.01)

(52) U.S. Cl.
CPC .......... *G06F 40/253* (2020.01); *G06F 40/242* (2020.01); *G06F 40/284* (2020.01)

(58) Field of Classification Search
None
See application file for complete search history.

(56) References Cited

U.S. PATENT DOCUMENTS 8,798,990 B2 * 8/2014 Bangalore ............. G10L 15/183
704/275
9,311,299 B1 * 4/2016 Petrov ..................... G06F 40/40
(Continued)

OTHER PUBLICATIONS

Behera. "An Experiment with the CRF++ Parts of Speech (POS) Tagger for Odia". Language in India ISSN 1930-2940 vol. 17:Jan. 1, 2017 (Year: 2017).*
(Continued)

*Primary Examiner* — Jesse S Pullias
(74) *Attorney, Agent, or Firm* — Michael Fainberg; ArentFox Schiff LLP

(57) ABSTRACT

A system for providing intelligent part of speech processing of complex natural language is disclosed. The system identifies a multiword concept from an input and replaces the multiword concept with a token to be tagged as a desired part of speech. The system passes the modified text including the token to a part-of-speech tagger to tag each word in the text with the appropriate part-of-speech. The system may replace the token with the original text that the token was utilized to replace so that the original intent of the text is evident. The system may analyze the tagged text to generate analyses and interpretations associated with the input. When multiple multiword concepts are identified, the system may evaluate them by computing scores for each of the multiword concepts that may be replaced with tokens, for each of the modified texts including the tokens, or for any interpretations and analyses thereof.

21 Claims, 6 Drawing Sheets

Related U.S. Application Data continuation of application No. 15/994,869, filed on May 31, 2018, now Pat. No. 10,599,767.

(56) References Cited

U.S. PATENT DOCUMENTS

| | | | |
|---|---|---|---|
| 10,599,767 B1* | 3/2020 | Mattera | G06F 40/242 |
| 11,537,793 B2* | 12/2022 | Mattera | G06F 40/242 |
| 2009/0030686 A1* | 1/2009 | Weng | G10L 15/1822 |
| | | | 704/E15.001 |
| 2011/0040553 A1* | 2/2011 | Sasivarman | G06F 40/30 |
| | | | 704/9 |
| 2013/0030787 A1* | 1/2013 | Cancedda | G06F 40/44 |
| | | | 704/2 |
| 2013/0085756 A1* | 4/2013 | Chotimongkol | G09B 19/04 |
| | | | 704/243 |
| 2013/0151508 A1* | 6/2013 | Kurabayashi | G06F 16/90328 |
| | | | 707/723 |
| 2016/0162466 A1* | 6/2016 | Munro | G06F 40/284 |
| | | | 704/9 |
| 2016/0259775 A1* | 9/2016 | Gelfenbeyn | G06F 40/35 |
| 2019/0294962 A1* | 9/2019 | Vezer | G06N 7/01 |

OTHER PUBLICATIONS

Elakiya et al. "Designing Preprocessing Framework (ERT) for Text Mining Application". 2017 International Conference on IoT and Application (ICIOT), May 19-20, 2017, Nagapattinam, India (Year: 2017).*

* cited by examiner

300

NOUNIZATION

SENTENCE: The parameter Is Valid shows the current status

302
WITHOUT USING SYSTEM 100:
The:DT parameter:NN Is:VBZ Valid:JJ shows:NNS
the:DT current:JJ status:NN .:.
    Subject:
        parameter
    Relations:
        Is(parameter, Valid)
        show(parameter, current_status)

304
USING SYSTEM 100:
The:DT parameter:NN NlpId _27:NN
shows:VBZ the:DT current:JJ status:NN .:.
    Intermediate Subject:

NlpId_27
Intermediate Relation:
    show(parameter_ NlpId _27, current_status)
    Final Subject:

Is Valid
Final Relation:
    show(parameter_ Is_Valid, current_status)

VERBIZATION

SENTENCE: The product is task scheduling and monitoring for security threats 402 — WITHOUT USING SYSTEM 100:
The:DT product:NN is:VBZ task:NN scheduling:NN and:CC monitoring:NN for:IN security:NN threats:NNS .:.
    Subject:
        product
    Action:
        be
    Object:
        task scheduling
    Relation:
        be(product, task scheduling)

scheduling(product, security threat)

404 — USING SYSTEM 100:
The:DT product:NN tokening:VBG for:IN security:NN threats:NNS .:.
    Subject: product
    Intermediate Action: tokening
    Object: security threats
    Intermediate relation:
tokening(product, security threats)
    Final action: Task Scheduling and Monitoring
    Final Relation: Task Scheduling and Monitoring(product, security threats).

FIG. 4

SYSTEM FOR PROVIDING INTELLIGENT PART OF SPEECH PROCESSING OF COMPLEX NATURAL LANGUAGE

CROSS-REFERENCE TO RELATED APPLICATIONS

The present application a continuation of U.S. patent application Ser. No. 16/827,089 filed on Mar. 23, 2020, and will issue on Dec. 27, 2022 as U.S. Pat. No. 11,537,793, which is a continuation of U.S. patent application Ser. No. 15/994,869 filed on May 31, 2018, now U.S. Pat. No. 10,599,767, which is related to U.S. patent application Ser. No. 15/905,362 filed on Feb. 26, 2018, now U.S. Pat. No. 10,769,056, all of which are hereby incorporated by reference in their entireties. The present application is also related to U.S. patent application Ser. No. 15/994,910 filed on May 31, 2018, now U.S. Pat. No. 11,010,284, having the title "System for Understanding Navigational Semantics via Hypothesis Generation and Contextual Analysis"; U.S. patent application Ser. No. 15/994,984 filed on May 31, 2018, now U.S. Pat. No. 10,747,651, having title "System for Optimizing System Resources and Runtime During a Testing Procedure"; U.S. patent application Ser. No. 15/994,851 filed on May 31, 2018, now U.S. Pat. No. 11,113,175, having the title "System for Discovering Semantic Relationships in Computer Programs; and U.S. patent application Ser. No. 15/994,845 filed on May 31, 2018, now U.S. Pat. No. 10,977,155, having the title "System for Providing Autonomous Discovery of Field or Navigation Constraints," all of which are hereby incorporated by reference in the present disclosure in their entireties.

FIELD OF THE INVENTION

The present application relates to computing technologies, natural language processing technologies, machine learning technologies, testing technologies, software evaluation technologies, software optimization technologies, token-based technologies and more particularly, to a system and method for providing intelligent part of speech processing of complex natural language.

BACKGROUND

In today's technologically-driven society, users and businesses are increasingly relying on computing systems for facilitating and providing various types of services. As the reliance on computing systems has increased, so has the need for high quality natural language processing techniques to ensure computing systems communicative effectively with users. To that end, developments in natural language processing techniques have made computing systems capable of reading text, processing speech, interpreting text and speech, determining sentiments within text and speech, and determining relationships between words in the speech. Natural language processing techniques include, but are not limited to, statistical natural language processing techniques, machine learning natural language processing techniques, rules-based natural language processing techniques, algorithmic natural language processing techniques, among other natural language processing techniques. Such techniques may be utilized by computing systems to parse text, perform part-of-speech tagging on the text, identify languages associated with the text, and identify semantic relationships. Certain natural language processing systems are capable of translating text in provided in one language into a different language, performing speech-to-text or text-to-speech conversions, generating summaries for text, analyzing sentiments of individuals that have created text, extracting contextual information from analyzed text, determining topics and subject matters associated with text, supplementing analyzed text, and categorizing text based on a variety of criteria.

Various natural language processing systems include part-of-speech taggers. Part-of-speech taggers of natural language processing systems typically comprise software that can read text provided in a certain language and can assign parts of speech to each word in the text. For example, part-of-speech taggers may identify and tag nouns, verbs, adjectives, prepositions, and other parts of speech within a particular text. Certain part-of-speech taggers can also identify the subject of a sentence, the object of a sentence, and other types of relationships associated with the words included in text. In some natural language processing systems, text may be manually annotated with concepts, which may include multiword concepts. The annotated text may then be utilized to train a natural language processing system so that when different text is parsed and analyzed by the natural language processing system, the natural language processing system may recognize and understand the concept when it appears in the different text.

While current natural language processing systems provide various advantages and useful functionality, a common problem that may occur is that a complex topic, title, or parameter provided in text that is encountered by a natural language processing system may be described by multiple words or groups of words. These multiple words may confuse a part-of-speech tagger of a natural language processing system, which may incorrectly identify words in the text as being nouns, verbs, or other parts of speech, when, in reality, the identified words should be tagged as different parts of speech based on the intent of the user or device that supplied the text. Additionally, as indicated above, while certain natural language processing systems allow for annotating text with concepts, such annotated text is typically necessary to train the natural language processing systems to recognize such concepts when analyzing other texts. Such training is often time consuming, computationally expensive and requires the increased use of memory resources, processor resources, and network bandwidth. Furthermore, to maintain accuracy and effectiveness, such training must be performed regularly and periodically to reflect the changing usage of concepts within a text, a project, a domain, a language, or languages. While application and domain specific dictionaries associated with current natural language processing solutions could theoretically be extended to improve their recognition of multi-word combinations common in domain specific applications, such an extension would still suffer quality, performance, and maintenance issues.

Based on the foregoing, current natural language processing technologies and processes may be modified and improved so as to provide enhanced functionality and features. Such enhancements and improvements may effectively decrease the effort required to parse and understand text, while simultaneously improving the accuracy of natural language processing systems. Additionally, such enhancements and improvements may provide for optimized annotating capabilities, increased autonomy, improved interactions with users or devices, improved user satisfaction, increased efficiencies, increased access to meaningful data, substantially-improved decision-making abilities, increased ease-of-use, and simplified or reduced maintenance. Furthermore, such enhancements and improvements may reduce processor, memory, and network bandwidth usage. Moreover, such enhancements and improvements may increase a natural language processing system's ability to ascertain the meaning of words in text, determine relationships between the words in the text, and tag parts of speech accurately and effectively.

SUMMARY

A system and accompanying methods for providing intelligent part of speech processing of complex natural language are disclosed. Notably, the system and accompanying methods may be utilized to enable natural language processing systems more readily understand text including multi-word objects, generate accurate part-of-speech tagging annotations, generate accurate subject, verb, object, and other sentence artifacts, and perform a variety of other functions as described in the present disclosure. Based on the foregoing, the systems and methods may enable programs, devices, and/or users using and/or accessing outputs generated by the systems and methods to more easily understand the intent of a particular text. Moreover, necessary functionality and features provided by the systems and methods do not require the use of a training phase to train a natural language processing system, which results in substantial time and computer resource savings, while simultaneously reducing the complexity of the functionality to effectively provide intelligent part of speech processing of complex natural language.

In order to accomplish the foregoing, the systems and methods involve, in a first phase, identifying one or more multiword concepts from a particular input and replacing the multiword concepts with tokens to be tagged as a desired part of speech so as to create a modified or rewritten version of the input. Then, in a second phase, the systems and methods include passing the text (e.g. sentences, paragraphs, or other words groupings) including the multiword concepts replaced by tokens to a part-of-speech tagger of a natural language processing system to tag each word in the text, including the tokens, with the appropriate corresponding part-of-speech. For example, in certain embodiments, the part-of-speech tagger may recognize or treat (i.e. tag) the token as nouns (or other desired parts of speech), and parse the remaining text in the input. Thus, the part-of-speech tagger (e.g. an encapsulated part-of-speech tagger that comprises an existing part-of-speech tagger enhanced by the functionality of the system 100 and/or an entirely standalone part-of-speech tagger provided by the system 100 as disclosed herein) of the natural language processing system can, with substantially higher confidence that existing systems, correctly identify the subject, verb, action, and other parts of speech from the text as output of the natural language processing system. In a third phase, the systems and methods may include replacing the token with the original text that the token was utilized to replace. This may be performed so that the original intent of the text in the input is readily ascertainable. In certain embodiments, the text may be analyzed by the systems and methods to generate analyses, outputs, and/or interpretations, which may be scored by the systems and methods as normalized numbers, confidences, or a combination thereof. In certain embodiments, the systems and methods may generate scores (e.g. confidences) and associate them with individual part-of-speech identifiers and with the corresponding text, sentences, and/or phrases in the input as a whole. In certain embodiments, the generated scores may be normalized.

In certain embodiments, the system and methods may determine multiple multiword concepts within a particular input. When multiple multiword concepts are identified, the systems and methods may include, in a fourth phase, evaluating the various alternatives. The evaluation may include computing scores and/or confidences for each combination of multiword concepts that may be replaced with tokens, for each of the rewritten texts (e.g. sentences) including the tokens, or for any interpretations and/or analyses thereof. In certain embodiments, it may be that a first token is a subset, superset, or partial overlap, of a second token when evaluating the various alternatives. For example, given word1 word2 and word3, then a first alternative may be: token1 word3 (token 1=word1 word2), but a second alternative may be: word1 token2 (token2=word2 word3). A third alternative may be token1 token2, where the tokens share or duplicate the word2. In certain embodiments, if recursively processing, a token may contain one or more tokens within it. Lastly, the systems and methods may include applying a selection process to select the most appropriate multiword concepts to be replaced with tokens, rewritten version of the text, or interpretation. For example, the multiword concepts having a threshold score may be selected or the multiword concept having a highest score may be selected.

Notably, in one embodiment according to the present disclosure, a system for providing intelligent part of speech processing of complex natural language is disclosed. The system may include a memory that stores instructions and a processor that executes the instructions to perform operations conducted by the system. In certain embodiments, the memory may also store dictionary information, models, learning information, and/or other information that may assist the system in identifying one or more sets of words, concepts, ideas, titles, groupings, or a combination thereof. The system may perform an operation that includes identifying a set of words from among a plurality of words in an input. In certain embodiments, the identified set of words may describe a concept, idea, title, grouping, or a combination thereof, and may correspond to a parameter. The system may proceed to perform an operation that includes replacing the set of words identified in the input with a token that correlates to the set of words to generate a first modified input. In certain embodiments, the token may be constructed by the system to appear as a selected or desired part of speech to a part-of-speech tagger. For example, if the set of words include a verb and an adjective, the token replacing the set of words including the verb and adjective may be constructed by the system to be interpreted as a noun (e.g. a token for a verb may be the token "tokening" which ends in a verb ending "ing"; and a token for an adjective may be the token "tokenest" to appear as an adjective). The system may proceed to perform an operation that includes tagging, by utilizing the part-of-speech tagger, parts of speech for each word and the token in the first modified input to generate tagged part of speech text for the first modified input. Notably, the token may be tagged by the part-of-speech tagger according to the selected or desired part of speech. Once the words are tagged by the part-of-speech tagger, the system may perform an operation that includes replacing, in the tagged part of speech text for the first modified input, the token with the set of words originally identified in the input to generate a second modified input. The system may then proceed to analyze the second modified input to generate analyses and interpretations associated with words in the plurality of words of the input.

In another embodiment, a method for providing intelligent part of speech processing of complex natural language is disclosed. The method may include utilizing a memory that stores instructions, and a processor that executes the instructions to perform the various functions of the method. In particular, the method may include receiving, at a system, an input from one or more sources. Additionally, the method may include identifying a set of words from among a plurality of words in the input that correspond to a parameter, product, component, method names, user profile names, role profile names, window names, a user profile, an action, an operation to take, an object on and/or in application or web page, or any combination thereof (e.g. The input may be "The parameter first variable is being tested" and the method may identify "first variable" as a set of words corresponding to a parameter). The method may also include replacing the set of words identified in the input with a token correlating to the set of words to generate a first modified input. In certain embodiments, the token may be constructed so as to be characterized as a selected or desired part of speech by a part-of-speech tagger. By utilizing the part-of-speech tagger the method may include tagging parts of speech for each word and the token in the first modified input to generate tagged part of speech text for the first modified input. Once the parts of speech for each word and the token are tagged, the method may include replacing, in the tagged part of speech text for the first modified input, the token with the set of words originally identified in the input to generate a second modified input. Moreover, the method may include analyzing the second modified input to generate analyses and interpretations associated with words in the plurality of words of the input.

In another embodiment, another system for providing intelligent part of speech processing of complex natural language is disclosed. The system may include a memory that stores instructions and a processor that executes the instructions to perform operations conducted by the system. The system may perform an operation that includes identifying a set of words, text with errors, missing text, and/or non-text items (e.g. emojis, GIFs, emoticons, symbols, video content, audio content, media content, any non-text content, or a combination thereof) in an input. In certain embodiments, the identified set of words, text with errors, missing text, and/or non-text items may describe a concept, idea, title, grouping, or a combination thereof, and may correspond to a parameter. The system may proceed to perform an operation that includes replacing the set of words, mixing text, text with errors, and/or non-text items identified in the input with a token that correlates to the set of words, text with errors, missing text, and/or non-text items to generate a first modified input. In certain embodiments, the token may be constructed by the system to appear as a selected or desired part of speech to a part-of-speech tagger. For example, if the set of words, text with errors, missing text, and/or non-text items include or would convey a verb and an adjective, the token replacing the set of words, missing text, text with errors, and/or non-text items including the verb and adjective may be constructed by the system to be interpreted as a noun (e.g. a token for a verb may be the token "tokening" which ends in a verb ending "ing"; and a token for an adjective may be the token "tokenest" to appear as an adjective). The system may proceed to perform an operation that includes tagging, by utilizing the part-of-speech tagger, parts of speech for each word, missing text, text with errors, and/or non-text item and the token in the first modified input to generate tagged part of speech text for the first modified input. Notably, the token may be tagged by the part-of-speech tagger according to the selected or desired part of speech. Once the words, missing text, text with errors, and/or non-text items are tagged by the part-of-speech tagger, the system may perform an operation that includes replacing, in the tagged part of speech text for the first modified input, the token with the set of words, missing text, text with errors, and/or non-text items originally identified in the input to generate a second modified input. The system may then proceed to analyze the second modified input to generate analyses and interpretations associated with words, missing text, text with errors, and/or non-text items of the input.

In another embodiment, a system for providing intelligent part of speech processing of complex natural language is disclosed. The system may include a memory that stores instructions and a processor that executes the instructions to perform operations conducted by the system. The system may perform an operation that includes identifying a set of words from among a plurality of words in an input. In certain embodiments, the identified set of words may describe a concept, idea, title, grouping, or a combination thereof, and may correspond to a parameter. The system may proceed to perform an operation that includes replacing the set of words identified in the input with a token that correlates to the set of words to generate a first modified input. The system may proceed to perform an operation that includes tagging, by utilizing the part-of-speech tagger, parts of speech for each word and the token in the first modified input to generate tagged part of speech text for the first modified input. Notably, the token may be tagged by the part-of-speech tagger according to the selected or desired part of speech. Once the words are tagged by the part-of-speech tagger, the system may perform an operation that includes replacing, in the tagged part of speech text for the first modified input, the token with the set of words originally identified in the input to generate a second modified input. The system may then proceed to analyze the second modified input to generate analyses and interpretations associated with words in the plurality of words of the input. In certain embodiments, the system may include a learning engine where data generated by the system is provided to train the operation of the system. For example, as sets of words are identified the identified sets of words are fed to the learning engine, the learning engine may assist in the selection of one or more sets of the identified sets of words, such as by comparing the sets of words to sets of words stored in the learning engine or in an external system that may have a relation to the input. The learning engine may also assist in scoring and/or selecting identified sets of words, tokens, part-of-speech tagged text, analyses, interpretations, post de-tokenization analysis, or a combination thereof, for use with the system.

In a further embodiment, a system for providing intelligent part of speech processing of complex natural language is disclosed. The system may be configured to preprocess an input received by the system. For example, an input including text may be preprocessed into text components, such as, but not limited to, paragraphs, sentences, phrases, and/or other groupings. Additionally, if the input includes media content (e.g. audio, video, or other content), the input may be preprocessed using video/audio processing techniques to extract text from the media content. Once the input is preprocessed, system may perform an operation that includes identifying a set of words from among a plurality of words in the input. In certain embodiments, the identified set of words may describe a concept, idea, title, grouping, or a combination thereof, and may correspond to a parameter. The system may proceed to perform an operation that includes replacing the set of words identified in the input with a token that correlates to the set of words to generate a first modified input. In certain embodiments, the token may be constructed by the system to appear as a selected or desired part of speech to a part-of-speech tagger. The system may proceed to perform an operation that includes tagging, by utilizing the part-of-speech tagger, parts of speech for each word and the token in the first modified input to generate tagged part of speech text for the first modified input. Notably, the token may be tagged by the part-of-speech tagger according to the selected or desired part of speech. Once the words are tagged by the part-of-speech tagger, the system may perform an operation that includes replacing, in the tagged part of speech text for the first modified input, the token with the set of words originally identified in the input to generate a second modified input. The system may then proceed to analyze the second modified input to generate analyses and interpretations associated with words in the plurality of words of the input.

According to yet another embodiment, a computer-readable device, such as a non-transitory computer-readable device, having and storing instructions for providing intelligent part of speech processing of complex natural language is provided. In certain embodiments, the computer-readable device may also store dictionary information, models, learning information, and/or other information that may assist a processor executing the instructions to identify one or more sets of words, concepts, ideas, titles, groupings, or a combination thereof. The computer instructions, which when loaded and executed by a processor, may cause the processor to perform operations including: receiving, at a system, an input from a source; identifying a set of words from among a plurality of words in the input, wherein the set of words correspond to a parameter; replacing the set of words identified in the input with a token correlating to the set of words to generate a first modified input, wherein the token is constructed to be characterized as a selected part of speech by a part of speech tagger; tagging, by utilizing the part of speech tagger and by utilizing instructions from a memory that are executed by a processor of the system, parts of speech for each word and the token in the first modified input to generate tagged part of speech text for the first modified input; replacing, in the tagged part of speech text for the first modified input, the token with the set of words identified in the input to generate a second modified input; analyzing the second modified input to generate analyses and interpretations associated with words in the plurality of words; and computing scores for the analyses and interpretations associated with the words in the plurality of words.

These and other features of the systems and methods for providing intelligent part of speech processing of complex natural language are described in the following detailed description, drawings, and appended claims.

BRIEF DESCRIPTION OF THE DRAWINGS

FIG. 3 illustrates a sample use case scenario whereby a phrase in a sentence is replaced with a token to accomplish nounization according to an embodiment of the present disclosure.

FIG. 4 illustrates another sample use case scenario whereby a phrase in a sentence is replaced with a token to accomplish verbization according to an embodiment of the present disclosure.

DETAILED DESCRIPTION OF THE INVENTION

Figure 1:
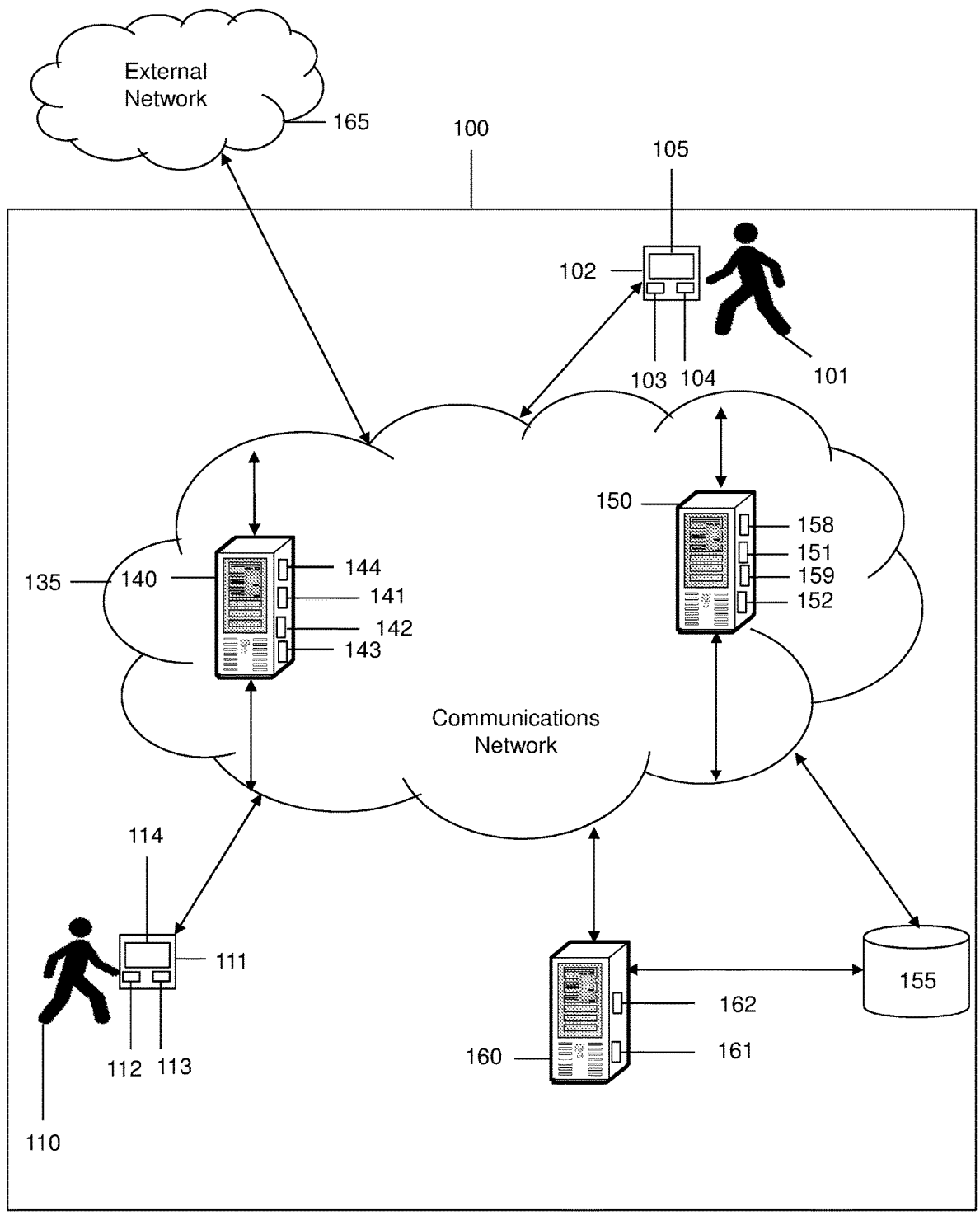
FIG. 1 is a schematic diagram of a system for providing intelligent part of speech processing of complex natural language according to an embodiment of the present disclosure.

A system 100 and accompanying methods for providing intelligent part of speech processing of complex natural language are disclosed. Notably, the system 100 and accompanying methods may be utilized to enable natural language processing systems (e.g. natural language processing engine 143 and part-of-speech tagger 144) to more readily understand text including multi-word objects, generate accurate part-of-speech tagging annotations, generate accurate subject, verb, object, and other sentence artifacts, and perform a variety of other functions as described in the present disclosure. Based on the foregoing, the system 100 and methods may enable programs, devices, and/or users using and/or accessing outputs generated by the system 100 and methods to more easily understand the intent of a particular text. Moreover, the functionality and features provided by the system 100 and methods do not require the use of a training phase to train a natural language processing system, which results in substantial time and computer resource savings, while simultaneously reducing the complexity of the functionality to effectively provide intelligent part of speech processing of complex natural language.

In order to accomplish the foregoing, the system 100 and methods involve, in a first phase, identifying a multiword concept from a particular input and replacing the multiword concept with a token to be tagged as a desired part of speech so as to create a modified or rewritten version of the input. Then, in a second phase, the system 100 and methods include passing the text (e.g. sentences, paragraphs, or other words groupings) including the multiword concept replaced by the token to a part-of-speech tagger 144 of a natural language processing system to tag each word in the text, including the token, with the appropriate corresponding part-of-speech. For example, in certain embodiments, the part-of-speech tagger 144 may recognize or treat (i.e. tag) the token as nouns (or other desired parts of speech), and parse the remaining text in the input. Thus, the part-of-speech tagger 144 of the natural language processing system may correctly identify the subject, verb, action, and other parts of speech from the text as output of the natural language processing system. In a third phase, the system 100 and methods may include replacing the token with the original text that the token was utilized to replace so that the original intent of the text in the input is readily ascertainable. For the occasion where multiple multiword concepts are identified, the system 100 and methods may include, in a fourth phase, evaluating the various alternatives. The evaluation may include computing scores and/or confidences for each of the multiword concepts that may be replaced with tokens, for each of the rewritten texts (e.g. sentences)

including the tokens, or for any interpretations and/or analyses associated therewith. Lastly, the system 100 and methods may include applying a selection process to select the most appropriate multiword concepts to be replaced with tokens, rewritten version of the text, or interpretation. Such enhancements and features reduce processor, memory, and network bandwidth usage. Moreover, such enhancements and improvements increase a natural language processing system's ability to ascertain the meaning of words in text, determine relationships between the words in the text, and tag parts of speech accurately and effectively when compared with traditional systems.

As shown in FIGS. 1-6, a system 100 and method 500 for providing intelligent part of speech processing of complex natural language are disclosed. Notably, the system 100 may also be utilized to autonomously test a computing system as is described in further detail in U.S. patent application Ser. No. 15/905,362, filed on Feb. 26, 2018, which is incorporated by reference in its entirety. The system 100 may be configured to support, but is not limited to supporting, natural language processing services, machine learning services, data and content services, artificial intelligence services, computing applications and services, cloud computing services, internet services, satellite services, telephone services, software as a service (SaaS) applications and services, mobile applications and services, platform as a service (PaaS) applications and services, web services, client servers, and any other computing applications and services. The system 100 may include a first user 101, who may utilize a first user device 102 to access data, content, and applications, or to perform a variety of other tasks and functions. As an example, the first user 101 may utilize first user device 102 to access an application (e.g. a browser or a mobile application) executing on the first user device 102 that may be utilized to access web pages, data, and content associated with the system 100. In certain embodiments, the first user 101 may be any type of user that may desired to have content, such as text or other content, to be parsed by a natural language processing system, such as natural language processing engine 143 and/or part-of-speech tagger 144. In certain other embodiments, the first user 101 may be any type of user that may potentially desire to test one or more software applications created by the first user 101, created for the first user 101, under the control of the first user 101, being modified by the first user 101, associated with the first user 101, or any combination thereof. For example, the first user 101 may have created a software application that has functional features that manage, modify, and store human resource information for employees of a business. Of course, the system 100 may include any number of users and any amount of text may be parsed and any number of software applications may be tested.

The first user device 102 utilized by the first user 101 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102, to interact with various applications executing within the system 100, and to interact with the system 100 itself. In certain embodiments, the first user device 102 may include components that provide non-visual outputs. For example, the first user device 102 may include speakers, haptic components, tactile components, or other components, which may be utilized to generate non-visual outputs that may be perceived and/or experienced by the first user 101. In certain embodiments, the first user device 102 may be configured to not include interface 105. In certain embodiments, the first user device 102 may be a computer, a laptop, a tablet device, a phablet, a server, a mobile device, a smartphone, a smart watch, and/or any other type of computing device. Illustratively, the first user device 102 is shown as a mobile device in FIG. 1. The first user device 102 may also include a global positioning system (GPS), which may include a GPS receiver and any other necessary components for enabling GPS functionality, accelerometers, gyroscopes, sensors, and any other componentry suitable for a mobile device.

In addition to the first user 101, the system 100 may include a second user 110, who may utilize a second user device 111 to access data, content, and applications, or to perform a variety of other tasks and functions. As with the first user 101, in certain embodiments, the second user 110 may be any type of user that may desired to have content, such as text or other content, to be parsed by a natural language processing system, such as natural language processing engine 143 and/or part-of-speech tagger 144. Similarly, the second user 110 may be any type of user that may potentially desire to test one or more software applications created by the second user 110, created for the second user 110, under the control of the second user 110, being modified by the second user 110, associated with the second user 110, or any combination thereof. In certain embodiments, the second user 110 may be a user that may desire to test an application created, controlled, and/or modified by the second user 110, the first user 101, any number of other users, or any combination thereof. For example, the application may include one or more workflow items that have been modified and/or supplemented by the first user 101, the second user 110, and/or other users. Much like the first user 101, the second user 110 may utilize second user device 111 to access an application (e.g. a browser or a mobile application) executing on the second user device 111 that may be utilized to access web pages, data, and content associated with the system 100. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. a screen, a monitor, a graphical user interface, etc.) that may enable the second user 110 to interact with various applications executing on the second user device 111, to interact with various applications executing in the system 100, and to interact with the system 100. In certain embodiments, the second user device 111 may be a computer, a laptop, a tablet device, a phablet, a server, a mobile device, a smartphone, a smart watch, and/or any other type of computing device. Illustratively, the second user device 111 may be a computing device in FIG. 1. The second user device 111 may also include any of the componentry described for first user device 102.

In certain embodiments, the first user device 102 and the second user device 111 may have any number of software applications and/or application services stored and/or accessible thereon. For example, the first and second user devices 102, 111 may include human resource applications, artificial intelligence-based applications, machine learning-based applications, applications for facilitating the completion of tasks, cloud-based applications, search engine applications, natural language processing applications, database applications, algorithmic applications, phone-based applications, product-ordering applications, business applications, e-commerce applications, media streaming applications, content-based applications, gaming applications, internet-based applications, browser applications, mobile applications, service-based applications, productivity applications, video applications, music applications, social media applications, presentation applications, testing applications as described in U.S. patent application Ser. No. 15/905,362, filed on Feb. 26, 2018, software testing applications, hardware testing applications, computer testing applications, any other type of applications, any types of application services, or a combination thereof. In certain embodiments, the software applications may be applications under evaluation 230, which are described in further detail below. In certain embodiments, the software applications and services may include one or more graphical user interfaces so as to enable the first and second users 101, 110 to readily interact with the software applications. The software applications and services may also be utilized by the first and second users 101, 110 to interact with any device in the system 100, any network in the system 100, or any combination thereof. For example, the software applications executing on the first and second user devices 102, 111 may be applications for receiving data, applications for storing data, applications for receiving demographic and preference information, applications for transforming data, applications for executing mathematical algorithms, applications for generating and transmitting electronic messages, applications for generating and transmitting various types of content, applications for interacting with testing software (e.g. as described in U.S. patent application Ser. No. 15/905,362, filed on Feb. 26, 2018), any other type of applications, or a combination thereof. In certain embodiments, the first and second user devices 102, 111 may include associated telephone numbers, internet protocol addresses, device identities, or any other identifiers to uniquely identify the first and second user devices 102, 111 and/or the first and second users 101, 110. In certain embodiments, location information corresponding to the first and second user devices 102, 111 may be obtained based on the internet protocol addresses, by receiving a signal from the first and second user devices 102, 111, or based on profile information corresponding to the first and second user devices 102, 111. In certain embodiments, the location information may be obtained by utilizing global positioning systems of the first and/or second user devices 102, 111.

The system 100 may also include a communications network 135. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry, and may be controlled by a service provider. The communications network 135 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. Illustratively, server 140 and server 150 are shown as being included within communications network 135.

Notably, the functionality of the system 100 may be supported and executed by using any combination of the servers 140, 150, and 160. The servers 140, and 150 may reside in communications network 135, however, in certain embodiments, the servers 140, 150 may reside outside communications network 135. The servers 140 and 150 may be utilized to perform the various operations and functions provided by the system 100, such as those requested by applications executing on the first and second user devices 102, 111. Additionally, the servers 140, 150 may be configured to perform various operations of the static model discovery module 200, the model change management module 204, the dynamic model discovery module 206, the evaluators 220, the data transformers 232, the controller 224, the learning engine 226, the application under evaluation 230, any other component and/or program of the system 100, or a combination thereof. In certain embodiments, the server 140 may include a memory 141 that includes instructions, and a processor 142 that executes the instructions from the memory 141 to perform various operations that are performed by the server 140. The processor 142 may be hardware, software, or a combination thereof. In certain embodiments, in addition to the storage capabilities of the database 155 discussed in further detail in this disclosure, the servers 140, 150 may include storage components that may be configured to store and maintain dictionaries, models (e.g. agglomerated models 208), parameters, tokens, confidence scores, any information generated by the system 100 and/or methods described herein, or a combination thereof.

In certain embodiments, the server 140 may include a natural language processing engine 143, which may be comprised of hardware, software, or a combination thereof. The natural language processing engine 143 may include one or more modules and/or components including, but not limited to, a controller, one or more semantic libraries and/or databases, and/or one or more graph databases. In certain embodiments, the natural language processing engine 143 may reside and/or execute in the communications network 135 (such as in servers 140 and/or 150), the server 160, the first and/or second users devices 102, 111, any other component or device of the system 100, or any combination thereof. Illustratively, natural language processing engine 143 is shown as residing in server 140. In certain embodiments, the natural language processing engine 143 may reside in the external network 165 (e.g. accessible via a networked service interface), in other components of the system 100, and/or in any other desired system. In certain embodiments, the natural language processing engine 143 may be an off-the shelf natural language system that has been enhanced by the functionality and features as described herein for the system 100, the method 300, and/or otherwise. In certain embodiments, the natural language processing engine 143 may be software-as-a-service accessed by the system 100, such as a service provided by the external network 165.

Notably, the natural language processing engine 143 may utilize, include, and/or incorporate the functionality of any existing natural language processing system. In certain embodiments, content, such as but not limited to text content, media content (e.g. image content, video content, etc.), text derived from audio content, any type of content, or any combination thereof, may be preprocessed by the system 100 to extract text from the content. The extracted text may then be fed to the natural language processing engine 143 for further processing. For example, the natural language processing engine 143 may utilize one or more natural language processing techniques to analyze the extracted text to determine a context associated with the text, relationship between words and/or groups of words in the text, meaning in the text, an intent of the text, or any combination thereof. In certain embodiments, system 100 and/or the natural language processing engine 143 may be configured to include functionality to comprehend human language and/or speech, text in digital documents, text extracted from media content in digital files, text extracted from any type of audio content, text extracted from virtual reality content, text extracted from augmented reality content, any other comprehensible and/or parseable text, or any combination thereof. For example, the natural language processing engine 143 may be configured to comprehend human language and/or speech text that is spoken, written, symbolized, or a combination thereof, and may be configured to determine contextual information associated therewith. In certain embodiments, the system 100 and/or the natural language processing engine 143 may be configured to directly extract text from content without having the content being preprocessed first.

In certain embodiments, the natural language processing engine 143 may be configured to analyze and/or parse text (or other content and information) extracted from content included in inputs provided by any of the devices and components in the system 100, text extracted from content existing and/or accessible on the first and/or second user devices 102, 111, text extracted from content on any of the devices of the system 100, text extracted from content from any source external to the system 100 (e.g. external network 165), text extracted from content that has been scanned or otherwise uploaded into the system 100, text extracted from documents, text extracted from pictures, text extracted from video, text extracted from audio, or any combination thereof. The natural language processing engine 143 may apply and utilize natural language processing analysis rules to the text and/or content parsed by the natural language processing engine 143. Natural language processing techniques include, but are not limited, to n-gram, bag-of-words, co-referencing, part-of-speech tagging, stemming or lemmatizing, sentence breakdown, parsing, regular expression matching, subject or terminology extraction, relationship extraction, question and answer, similarity, annotating, rewriting, summarizing, sentiment analysis, intent analysis, statistical processing, machine learning, rules-based, algorithmic, translation, semantic, word embedding, concept extraction, other natural language understanding techniques, or any combination thereof. For example, in certain embodiments, the natural language processing engine 143 may be configured to utilize its analysis rules to consider the context and meaning of words, phrases, sentences, paragraphs, or other groupings of words extracted from inputs or sources of information. Additionally, the natural language processing engine 143 may be configured to determine the context and relationship of each word and/or group of words in an input to other words and/or groups of words in the same input and/or other different inputs or sources of information. In certain embodiments, the natural language processing engine 143 may be utilized to determine if text and/or content parsed from a particular input corresponds, relates, and/or matches with text and/or content existing in the system 100, such as in software code or documents associated with an application under evaluation 230 by the system 100, documents and files in the database 155, and documents, programs, and files utilized, provided, received and/ or stored by the internal data sources 201, the external data sources 202, the static model discovery module 200, the model change management module 204, the dynamic model discovery module 206, the agglomerated models 208, the evaluators 220, the data transformers 232, the outputs 240, the controller 224, the learning engine 226, or any combination thereof.

In certain embodiments, the natural language processing engine 143 may process and/or store media content, such as photographs, video content, audio content (e.g. audio recording corresponding to the text, for example), augmented reality content, virtual reality content, and/or any other information in association with terms, concepts, keywords, and/or identifiers (e.g. such as in semantic libraries) so that when such terms, concepts, keywords, and/or identifiers are encountered on a subsequent occasion, the natural language processing engine 143 may rapidly detect the terms, concepts, keywords, and/or identifiers. In certain embodiments, the natural language processing engine 143 may determine associations and similarities between the parsed text and content obtained from a document source with terms, concepts, keywords and/or identifiers stored in the system 100, such as by recognizing patterns in the attributes that correspond to the text and content, by determining synonyms for the text and/or content, by recognizing images and/or video (or other content) having similarities to the media content stored in the system 100, by performing any other natural language processing capabilities, or any combination thereof.

The controller of the natural language processing engine 143 may serve as the component of the natural language processing engine 143 that controls the functions and operations of the natural language processing engine 143. In particular, the controller may be configured to direct the natural language processing engine 143 to parse text and/or content from an input provided by a source (e.g. document file), analyze the parsed text and/or content for concepts and keywords, determine whether the parsed text and/or content match and/or correlate with concepts, keywords, content, terms, and/or identifiers from various document sources, and/or perform any of the other operations of the natural language processing engine 143. In certain embodiments, the controller may be configured to pass the parsed text and/or content through a series of semantic libraries so as to determine an initial set of potential concepts, words, keywords, content, and terms related to the parsed text and/or content in the input. Additionally, the controller may utilize any number and/or any type of natural language processing algorithms to facilitate in this process. In certain embodiments, the concepts, keywords, content, and terms of the semantic libraries may be related to the parsed text and/or content based on the concepts, keywords, content and terms of the semantic libraries having words, letters, or sounds in common with the parsed text and/or content, based on the keywords, content, and terms being in a same subject matter area of the parsed text and/or content, based on the concepts, keywords, content and terms being typically used in conjunction with the terms used in the parsed text and/or content, based on the keywords, content, and terms having any relation to the parsed text and/or content, based on the concepts, keywords, content and terms matching the parsed text and/or content (e.g. matching nouns and verbs in the parsed text with terms in the libraries), or any combination thereof. The semantic libraries may incorporate any functionality and features of existing and/or traditional semantic query libraries. Additionally, the semantic libraries may be configured to include repositories of information and data, along with relationships and associations between concepts, keywords, words, content, and their meanings, to enable the controller to determine content and terms relevant and/or related to the parsed text and/or content obtained from the input. The semantic libraries may enable the controller to determine the relevant content and terms based on the intent and contextual meaning of the terms contained within the parsed text and/or content obtained from the input. In certain embodiments, the data and information contained in the semantic libraries may be structured and formatted so as to enable the controller to consider the context of the parsed text and/or content including, but not limited to, a location associated with the parsed text and/or content, an intent associated with the parsed text and/or content, variations in the parsed text and/or content, concepts associated with the parsed text and/or content, a country of origin associated with the parsed text and/or content, a language associated with the parsed text and/or content, a domain associated with the parsed content (e.g. human resources, banking, taxes, etc.), a type of grammar associated with the parsed text and/or content, any other contexts, or any combination thereof.

In certain embodiments, once the initial set of potential concepts, keywords, terms, and/or content are determined by the controller based on the passing of the parsed text and/or content through the semantic libraries, the controller may then compare the initial set of concepts, keywords, terms and/or content to a graph database (e.g. database 155) to determine if additional terms and/or content are available and/or if more optimal terms and/or content related to the parsed text and/or content exist. The graph database utilized by the natural language processing engine 143 may incorporate any of the features and functionality of a traditional graph database, and may include additional concepts, keywords, terms, and/or content and machine instructions, media content, and/or information associated with the additional concepts, keywords, terms, and/or content. In certain embodiments, the graph database may utilize graph structures to represent and store data. Notably, the graph database may store relationships between the data and content stored within the graph database, and may store any type of data, content, and/or terms that may be utilized to assist in determining the content related to the parsed text and/or content obtained from the input. Data and content that is related to one another within the graph database may be readily retrieved by the graph database and/or system 100 based on their associations and/or correlations. In certain embodiments, the graph database may include additional concepts, keywords, content, and terms related to or associated with the parsed text and/or content that may not be contained in the semantic libraries. As a result, the graph database may serve as an additional resource for the controller to determine additional concepts, keywords, content, and terms associated with the parsed text and/or content that may be utilized by the natural language processing engine 143 for various purposes. If, based on the comparison to the graph database, additional concepts, keywords, terms, and/or content related to the parsed text and/or content obtained from the input are determined by the controller, these additional terms and/or content, along with the initial terms and/or content determined based on the semantic library comparison, may be utilized to obtain additional relevant information and/or content related to the text in the input.

In certain embodiments, the server 140 may include a part-of-speech tagger 144, which may be software, hardware, or a combination thereof. In certain embodiments, the part-of-speech tagger 144 may reside within the natural language processing engine 143, be a companion program of the natural language processing engine 143, or be a separate program from the natural language processing engine 143. In certain embodiments, the part-of-speech tagger 144 may be a new type of part-of-speech generated by and/or for the system 100, an enhanced version of an existing part-of-speech tagger, or a combination thereof. The part of speech tagger 144 may be a software program and/or function that may be configured to tag parts of speech for each word in a particular input. In certain embodiments, the part-of-speech tagger 144 may analyze text in an input, such as a sentence, and may attempt to assign, tag, and/or mark a part of speech for each word in the input. For example, the part-of-speech tagger 144 may label words in the input as nouns, verbs, adjectives, adverbs, prepositions, articles, direct objects, indirect objects, subjects of sentences, and/or any other desired part of speech. The natural language processing engine 143 and/or the part-of-speech tagger 144 may be configured to perform substantive operations conducted by the system 100. One such operation is the process of nounization. During nounization, the natural language processing engine 143 and/or the part-of-speech tagger 144 may identify a set of words in a particular input, which describe a concept, idea, title, or any other grouping, and replace the set of words with a token. The token, and its placement, may be constructed in a manner so as the token appears as a noun to the natural language processing engine 143 and/or the part-of-speech tagger 144. In certain embodiments, the noun type of the token may be additionally implied by using capitalization to cause it to appear like a proper noun. The part-of-speech tagger 144 may detect that it is capitalized, and not recognizing the token, may infer it is a proper name of some person, place, or thing. Whereas, in other embodiments, a lower case token may be utilized, and the part-of-speech tagger 144 may understand the token to be a common noun of some person, place, or thing it does not understand.

A second operation that the natural language processing engine 143 and/or the part-of-speech tagger 144 may be configured to perform is the process of verbization. Verbization may include having the natural language processing engine 143 and/or the part-of-speech tagger 144 identify a set of words which describe an action, state, or occurrence, or any other grouping, and replace the set of words with a token. The token, and its placement within the text of the input, may be constructed in a manner whereby the token appears as a verb to the part-of-speech tagger 144. The verb type of the token may be additionally implied by appending an "ing" or "ed" to the token. The part-of-speech tagger 144 may detect the appended "ing" or "ed" and recognize that typically such words are verbs and may tag/mark the token accordingly. A third operation that the natural language processing engine 143 and/or the part-of-speech tagger 144 may be configured to perform is the process of adverbization. Adverbization may include having the natural language processing engine 143 and/or the part-of-speech tagger 144 identify a set of words which describe a word or phrase that modifies or qualifies an adjective, verb, other adverb, or any other word group, and replace the set of words with a token. The token, and its placement in the text of the input, may be constructed in a manner whereby the token appears as an adverb to the part-of-speech tagger 144. The adverb type of the token may be additionally implied by appending an "ly" to the token. The part-of-speech tagger 144 may detect the appended "ly" and recognize that typically such words are adverbs and may mark/tag the token accordingly. A fourth operation that the natural language processing engine 143 and/or the part-of-speech tagger 144 may be configured to perform is the process of adjectivization. Adjectivization may include having the natural language processing engine 143 and/or the part-of-speech tagger 144 identify a word or set of words naming an attribute, added to or grammatically related to a noun to modify or describe it, and replace the word or set of words with a token. The token, and its placement in the text of the input, may be constructed in a manner whereby the token appears as an adjective to the part-of-speech tagger 144. The adjective type of the token may be additionally implied by the choice of token, such as by choosing a frequent adjective (ex a color: "fuchsia") and placing it before some noun. The part-of-speech tagger 144 may detect the color and its placement in the text of the input and may recognize that typically such words are adjectives. The part-of-speech tagger 144 may mark/tag the token accordingly. Of course, the natural language processing engine 143 and/or the part-of-speech tagger 144 may be configured to perform similar processes for any type of part of speech and is not intended to be limited to nounization, verbization, adverbization, and adjectivization.

Much like server 140, the server 150 may include a memory 151 that includes instructions, and a processor 152 that executes the instructions from the memory 151 to perform the various operations that are performed by the server 150. In certain embodiments, the servers 140, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 150 may be communicatively linked to the communications network 135, any network, any device in the system 100, or any combination thereof. In certain embodiments, the server 150 may include a tokenizer 158, which may be software, hardware, or a combination thereof. In certain embodiments, the tokenizer 158 may be its own separate entity or may reside within the natural language processing engine 143, be a companion program of the natural language processing engine 143, be a separate program from the natural language processing engine 143, reside in the part-of-speech tagger 144, reside in any component of system 100, or a combination thereof. In certain embodiments, the tokenizer 158 may be configured to do the various steps to perform nounization, verbization, adjectivization, adverbization, any other type of tokenization, or a combination thereof. The server 150 may also include a segmenter 159, which may be software, hardware, or a combination thereof. In certain embodiments, the segmenter 159 may be its own separate entity or may reside within the natural language processing engine 143, be a companion program of the natural language processing engine 143, be a separate program from the natural language processing engine 143, reside in the part-of-speech tagger 144, reside in any component of system 100, or a combination thereof. In certain embodiments, the segmenter 159 may be configured to select sentences, phrases, word groupings, any type of text grouping, paragraphs, or any combination thereof, from an input, so as to separate the input into multiple pieces or portions of text. In certain embodiments, each of the multiple pieces or portions of text may be scored by the system 100 as they are processed by the system 100.

The database 155 of the system 100 may be utilized to store and relay information that traverses the system 100, cache information and/or content that traverses the system 100, store data about each of the devices in the system 100, and perform any other typical functions of a database. In certain embodiments, the database 155 may store the output from any operation performed by the system 100, operations performed and output generated by the first and second user devices 102, 111, the servers 140, 150, 160, or any combination thereof. In certain embodiments, the database 155 may store a record of any and all information obtained from any data sources utilized by the system 100 to facilitate the operative functions of the system 100 and its components, store any information and data obtained from the internal and external data sources 201, 202, store the agglomerated models 208, store outputs generated by an application under evaluation 230, store feedback received from the first and second users 101, 110 and/or the first and second user devices 102, 111, store inputs entered into or utilized to interact with the application under evaluation 230, store software code 245 generated by the system 100, store reports 242 generated by the system 100, store analyses 243 generated by the system 100, store test results 246 generated by the system 100, store test data 247, store media content, store any information generated and/or received by the system 100, any other data traversing the system 100, or any combination thereof. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or be connected to a processor and memory to perform the various operations associated with the database 155. In certain embodiments, the database 155 may be connected to the servers 140, 150, 160, the first user device 102, the second user device 111, any devices in the system 100, any other device, any network, or any combination thereof.

The database 155 may also store information obtained from the system 100, store information associated with the first and second users 101, 110, store location information for the first and second user devices 102, 111 and/or first and second users 101, 110, store user profiles associated with the first and second users 101, 110, store device profiles associated with any device in the system 100, store communications traversing the system 100, store user preferences, store demographic information for the first and second users 101, 110, store information associated with any device or signal in the system 100, store information relating to usage of applications accessed by the first and second user devices 102, 111, store any information obtained from any of the networks in the system 100, store historical data associated with the first and second users 101, 110, store device characteristics, store information relating to any devices associated with the first and second users 101, 110, or any combination thereof. The user profiles may include any type of information associated with an individual (e.g. first user 101 and/or second user 110), such as, but not limited to, a username, a password, contact information, demographic information, psychographic information, an identification of applications used or associated with the individual, any attributes of the individual, any other information, or a combination thereof. Device profiles may include any type of information associated with a device, such as, but not limited to, operating system information, hardware specifications, information about each component of the device (e.g. sensors, processors, memories, batteries, versions, etc.), attributes of the device, any other information, or a combination thereof.

In certain embodiments, the database 155 may store algorithms facilitating the operation of the natural language processing engine 143, the part-of-speech tagger 144, the learning engine 226, the controller 224, the user interface 228, the agglomerated models 208, the evaluators 220, the data transformers 232, the static model discovery module 200, the model change management module 204, the dynamic model discovery module 206, the application under evaluation 230, the system 100 itself, any software application utilized by the system 100, or any combination thereof. In certain embodiments, the database 155 may be configured to store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

In certain embodiments, the system 100 may communicate and/or interact with an external network 165. In certain embodiments, the external network 165 may include any number of servers, databases, or other componentry, and, in certain embodiments, may be controlled by a service provider. The external network 165 may also include and be connected to a cloud-computing network, a phone network, a wireless network, an Ethernet network, a satellite network, a broadband network, a cellular network, a private network, a cable network, the Internet, an internet protocol network, a content distribution network, a virtual private network, any network, or any combination thereof. In certain embodiments, the external network 165 may be accessed by the components of the system 100, such as the natural language processing engine 143 and/or part-of-speech tagger 144 so that various sources of information may be consulted. For example, the natural language processing engine 143 and/or part-of-speech tagger 144 may access resources of the external network 165 to compare information and concepts obtained from parsing text to information contained in the resources of the external network 165 to confirm analyses and interpretations made by the natural language processing engine 143 and/or part-of-speech tagger 144 regarding the information and concepts. In certain embodiments, the external network 165 may be accessed by the components of the system 100 to obtain data and information that may potentially be utilized to discover models that may be included in the agglomerated models 208 (discussed later in this disclosure). For example, the system 100 may receive (or access) user stories, requirements, documentation, domain knowledge, existing test cases, computer software code, other data and information, or a combination thereof, provided by the external network 165 to assist in the creation and/or modification of one or more models of the agglomerated models 208. In certain embodiments, one or more components within the external network 165 may request the system 100 to test one or more of applications associated with the external network 165. In response, the system 100 may test the one or more applications and provide outputs 240 generated based on the testing to the external network 165. In certain embodiments, one or more of the models of the agglomerated models 208 may be transmitted to the external network 165.

The system 100 may also include a software application or program, which may be configured to perform and support the operative functions of the system 100. In certain embodiments, the application may be a software program, a website, a mobile application, a software application, a software process, or a combination thereof, which may be made accessible to users utilizing one or more computing devices, such as first user device 102 and second user device 111. In certain embodiments, the software application or program may include the natural language processing engine 143 and/or the part-of-speech tagger 144. The application of the system 100 may be accessible via an internet connection established with a browser program executing on the first or second user devices 102, 111, a mobile application executing on the first or second user devices 102, 111, or through other suitable means. Additionally, the application may allow users and computing devices to create accounts with the application and sign-in to the created accounts with authenticating username and password log-in combinations. The application may include a custom user interface 228 that the first user 101 or second user 110 may interact with, such as by utilizing a web browser or other program executing on the first user device 102 or second user device 111. In certain embodiments, the software application may execute directly as an installed program on the first and/or second user devices 102, 111, such as a mobile application or a desktop application. In certain embodiments, the software application may execute directly on any combination of the servers 140, 150, 160.

The software application may include multiple programs and/or functions that execute within the software application and/or are accessible by the software application. For example, the software application may include an application that generates web content and pages that may be accessible to the first and/or second user devices 102, 111, any type of program, or any combination thereof. The application that generates web content and pages may be configured to generate a user interface 228 for the software application that is accessible and viewable by the first and second users 101, 110 when the software application is loaded and executed on the first and/or second computing devices 102, 111. The user interface 228 for the software application may display content for viewing by the first and/or second users 101, 110 via the first and/or second user devices 102, 111. Additionally, the user interface 228 may display functionality provided by the software application that enables the first and second users 101,110 and/or the first and second computing devices 102, 111 to interact with the software application and any modules supporting the software application's functionality. In certain embodiments, the software application may be configured to include the static model discovery module 200, the model change management module 204, the dynamic model discovery module 206, the agglomerated models 208, the evaluators 220, the data transformers 232, the learning engine 226, the controller 224, the user interface 228, any program or process in the system 100, or any combination thereof.

Figure 2:
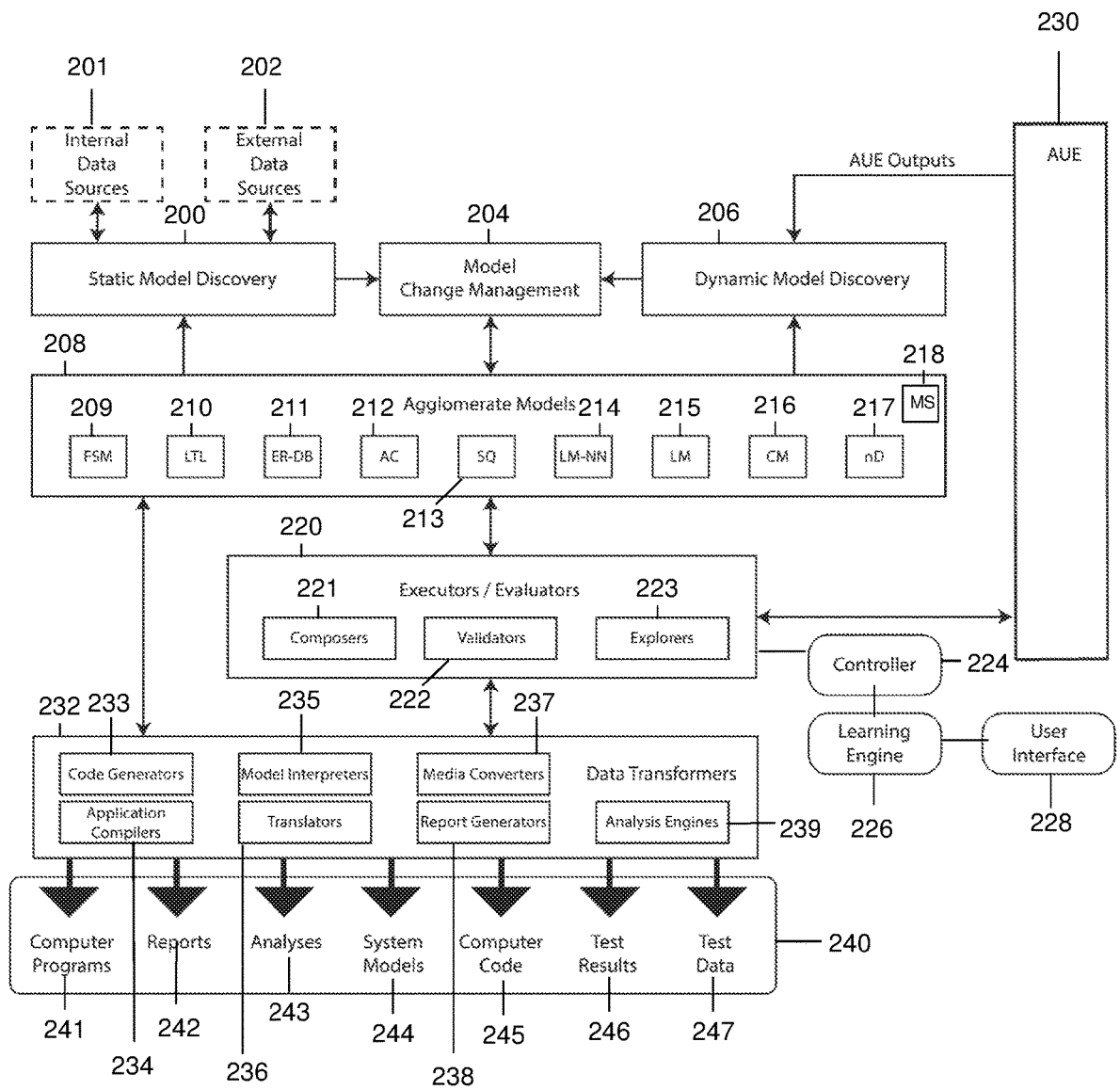
FIG. 2 is a schematic diagram illustrating various components of the system of FIG. 1, which facilitate the functional operation of the system of FIG. 1.

Referring now also to FIG. 2, various components of the system 100 are illustratively shown. The components of FIG. 2 may be utilized to facilitate the operation of the system 100 and facilitate the functionality of the natural language processing engine 143 and/or the part-of-speech tagger 144. In certain embodiments, the components illustrated in FIG. 2 may reside partially within communications network 135, entirely within communications network 135, entirely within the servers 140, 150, 160, partially within the servers 140, 150, 160, or any combination thereof. The system 100 may include one or more internal data sources 201. The internal data sources 201 may be data sources that contain data and information internal to the devices, processes, programs, and/or components of the system 100. The data and information included in the internal data sources

201 may include, but are not limited to, user stories, requirements, documentation, domain knowledge, existing test cases, computer software code, other data and information, or a combination thereof, which may be sources of text and content to be analyzed by the natural language processing engine 144 and/or the part-of-speech tagger 144, and may be utilized to facilitate the creation of models and/or update models utilized by the system 100. User stories, for example, may comprise, but are not limited to, natural language descriptions of one or more features of a particular computing system or software application. Requirements may include, but are not limited to, descriptions of requirements for one or more features of a particular computing system or software application. In certain embodiments, user stories and requirements may include images, pictures, videos, sounds, and/or any type of media content that may be analyzed by one or more components of the system 100. For example, if a particular user story includes pictures, the pictures may be web screens (i.e. actual or proposed), the pictures may be of steps to take in a particular process, pictures associated with a configuration of the system 100 or another system, etc. In certain embodiments, optical character recognition (OCR) or other image recognition techniques may be utilized to obtain text from pictures or media content, and may be utilized to facilitate the system's 100 understanding of the pictures or media content. Documentation may include, but is not limited to, digital documents containing information and data, which may be parsed by the natural language processing engine 143 and/or part-of-speech tagger 144 to obtain data and information which may be of use by the system 100, such as to construct one or more of the agglomerated models 208 and to confirm confidence in interpretations and analyses derived from analyzed text. Domain knowledge may include, but is not limited to, knowledge pertaining to a computing environment in which a particular computing system or application operates, the rules governing the domain, knowledge obtained from devices and users in the domain, user workflows, configurations and constraints utilized in the development of a software application, data pipelines, domain specific acronyms, any other domain information, or a combination thereof. Test cases may be tests that the system 100 may utilize to validate and/or verify a software program, computing system, hardware, and/or any thing that may be tested by the system 100. In certain embodiments, tests may comprise natural language descriptions of steps for the system 100 to take and items to verify in order to conduct a particular test. Computer software code may comprise, but is not limited to, a set of instructions that may form a computer program that may be executed by the system 100. The software code may also be analyzed and/or tagged by the natural language processing engine 143 and/or the part-of-speech tagger 144.

In certain embodiments, the system 100 may also include one or more external data sources 202. The external data sources 202 may be data sources that contain data and information external to the devices, processes, programs, and/or components of the system 100, which may be sources of text and content to be analyzed by the natural language processing engine 144 and/or the part-of-speech tagger 144. For example, the external data sources 202 may reside in networks outside of communications network 135 and may be not directly under the control of the system 100. The data and information included in the external data sources 202 may include, but are not limited to, user stories, requirements, documentation, domain knowledge, existing test cases, computer software code, web content, media content, data from external applications, outputs from devices external to the system 100, other data and information external to the system 100, or a combination thereof, which may be utilized to facilitate the creation of models and/or update models, such as the agglomerated models 208, which are discussed in further detail below. Additionally, the data and information in the external data sources 202 may be utilized by the natural language processing engine 143 and/or part-of-speech tagger 143 to confirm analyses, interpretations, and/or learning performed by the system 100. In certain embodiments, the data and information from the internal and external data sources 201, 202 (e.g. user stories, requirements, documentation, etc.) may be written and/or provided in natural language, in various natural language translations, and in various encodings. In certain embodiments, the data and information from the internal and data sources may be in provided in visual form (e.g. pictorially), in audible form, in source code, in pseudo-code, in virtual form, any form, or any combination thereof. In certain embodiments, the data and information may be in release notes, help files, and/or in other types of documents.

The system 100 may include a static model discovery module 200, which may be a software module executing within a software application that conducts the operations of the system 100. In certain embodiments, the static model discovery module 200 may comprise a combination of hardware and software. The static model discovery module 200 may perform processes associated with discovering model information from the internal and external data sources 201, 202, which may be utilized to generate one or more models of the agglomerated models 208. The models may comprise representations of systems, programs, functions, processes, or any combination thereof, which may be utilized as a basis for comparison to a computing system, program, application, and/or function to be analyzed and/or tested by the system 100. Model data extracted by the static model discovery module 200 from static sources, such as the internal and external data sources 201, 202 may contribute to the efficient and dynamic discovery of models associated with an application under evaluation 230. In certain embodiments, the static model discovery module 200 may be configured to discover model information from the internal and external data sources 201, 202 that does not generally change based on interactions between the system 100 and a particular application under evaluation 230. In certain embodiments, new documents from the internal and external data sources 201, 202 may be inserted and utilized at any time. In certain embodiments, a new document may include a new version of a previous document utilized by the static model discovery module 200. As a result, while a particular document may be static, the number of documents may not be. The static model discovery module 200 may be configured to recursively and continuously enhance model information extracted from the internal and external data sources 201, 202 through the use of agglomerated models 208 that have been developed from earlier static and dynamic model discovery, executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

In certain embodiments, the system 100 may include a model change management module 204, which may be a software module executing within a software application that conducts the operations of the system 100. In certain embodiments, the model change management module 204 may comprise a combination of hardware and software. The model change management module 204 may perform processes associated with modifying and/or updating agglomerated models 208 based upon static and dynamic discovery processes conducted by the static model discovery module 200 and the dynamic model discovery module 206, which is discussed in further detail below. In certain embodiments, the model change management module 204 may modify one or more models of the agglomerated models 208 specifically when source concepts extracted from the static and dynamic discovery processes are of a threshold confidence level or are within a range of confidence levels. In certain embodiments, the module change management module 204 may be configured to resolve conflicts and manage issues that may arise from simultaneous and asynchronous static and dynamic discovery. For example, if information obtained from a static discovery process performed by the static model discovery module 200 conflicts with information obtained from a dynamic discovery process performed by the dynamic discovery module 206, the model change management module 204 may arbitrate which information should be utilized to update the agglomerated models 208, which information should be excluded from updates to the agglomerated models 208, and which information should be modified prior to inclusion into the agglomerated models 208.

As indicated above, the system 100 may include a dynamic model discovery module 206, which may be a software module executing within a software application that conducts the operations of the system 100. In certain embodiments, the dynamic model discovery module 206 may comprise a combination of hardware and software. The dynamic model discovery module 206 may perform processes associated with discovering model information from a specific application under evaluation 230 that is being tested, analyzed, and/or explored by the system 100. For example, the dynamic model discovery module 206 may discover model information used to generate new models for the agglomerated models 208 or update existing models in the agglomerated models 208 based on information and data gathered from outputs generated based on interactions between the system 100 and the application under evaluation 230 being tested by the system 100. In certain embodiments, the dynamic model discovery module 206 may represent the model extraction component of the system 100 associated with interactions and hypothesis testing driven by evaluators 220 on the application under evaluation 230. In certain embodiments, the dynamic model discovery module 206 may recursively and continuously enhance model information extracted from interactions between the system 100 and the application under evaluation 230 through the use of agglomerated models 208 developed from earlier static and dynamic model discovery (i.e. previously conducted static and dynamic model discovery), executor/evaluator 220 testing of hypotheses (e.g. testing hypotheses relating to the expected functionality of an application under evaluation 230), the data transformers 232, the learning engine 226, and user inputs received from the first and/or second users 101, 110 via the first and/or second user devices 102, 111.

The system 100 may include a set of agglomerated models 208. In certain embodiments, the models may comprise representations of systems, programs, functions, processes, information, data, or any combination thereof, which may be utilized as a basis for comparison to a computing system, program, application, and/or function to be analyzed, and/or explored, and/or tested by the system 100. For example, a model of the agglomerated models 208 may be utilized by a software application performing the operations of the system 100 to determine whether a particular application under evaluation 230 has any defects, conflicts, or other issues based on a comparison of the model to one or more functions, features, and/or states of the application under evaluation 230. The agglomerated models 208 may include models contributed to or generated from an application under evaluation 230, and may be utilized to interpret unstructured and incomplete information obtained from the internal data sources 201, external data sources 202, the application under evaluation 230, any other source, or any combination thereof. For example, the agglomerated models 208 may be utilized to interpret information from JIRAs, application programming interface documents, user stories, code comments, requirements, any other information, or any combination thereof. The agglomerated models 208 may be modified, updated, removed, replaced, or otherwise changed by the model change management module 204, and may be created based on information and data obtained from the internal and external data sources 201, 202 by the static discovery model module 200 and/or by information gathered from interactions by the system 100 with the application under evaluation 230 and/or other applications that have been already evaluated or will be evaluated in the future. In certain embodiments, an agglomerated model 208 or models may correspond with realized representations of the application under evaluation 230, unrealized representations of the application under evaluation 230 (e.g. a future specified capability of the application under evaluation which has not been fully implemented yet, a representation of the expected operations of the application under evaluation 230 where the actual operations may include differences, errors or inconsistencies, or other representation not fully consistent with the operations of the application under evaluation), or any combination thereof, in whole or in part.

The agglomerated models 208 may include any type of model that may be utilized to perform the functionality provided by the system 100, and may represent data and information common to the operation of the system 100 across all applications under evaluation 230, within common domains of the applications under evaluation 230, and in representation of a single application under evaluation 230. For example, the agglomerated models 208 may include, but are not limited to, finite state machine (FSM) models 209, linear temporal logic (LTL) models 210, entity relationship/database (ER-DB) models 211, activity (AC) models 212, sequence (SQ) models 213, learning model/neural network (LM-NN) models 214, language (LM) models 215, conceptual (CM) models 216, n-Dimensional physical (nD) models 217, mathematical models (MS) 218, petri nets, any other models, or any combination thereof. In certain embodiments, the FSM model 209 may be an abstract, mathematical model of computation that may be in exactly one of a finite number of states at any given time. The FSM model 209 may be defined by a list of its states, its initial state or states, and the conditions for each transition. In certain embodiments, the LTL models 210 may comprise modal temporal logic models with modalities that refer to time. The ER-DB models 211 may be composed of entity types, which classify things of interest, and may specify relationships that may exist between instances of the entity types. In certain embodiments, entity relationships in the ER-DB models 211 may describe inter-related things of interest within a specific domain of knowledge. In certain embodiments, the ER-DB models 211 may represent the relations in a relational database. The AC models 212 may represent workflows of stepwise activities and actions with support for choice, iteration, and concurrency, such as with respect to activities conducted within an application being tested (e.g. application under evaluation 230). The SQ models 213 may be models that capture how objects in an application operate with one another and in what order.

The LM-NN models 214 may refer to a broad class of models that may be utilized in machine learning applications and/or artificial intelligence applications. In certain embodiments, the LM-NN models 214 may be trained based on internal and external feedback received by the system 100. Such feedback may relate to hypothesis testing, user feedback, and/or any other feedback received by the system 100. The LM models 215 may be probability distributions over sequences of words. For example, given a particular sequence of length m, a LM model 215 may assign a probability $P(w_1, \ldots, w_m)$ to the whole sequence. In certain embodiments, the LM models 215 may refer to a variety of models built over text, such as part of speech tagging, lemmatizing, parsing, regular expression matching, annotating, summarizing, rewriting, along with other techniques. The CM models 216 may be representations of systems, which may be made of the composition of concepts that are utilized to help, know, understand and/or simulate an application or domain concept. The CM models 216 may also include relationships amongst the various concepts. The nD models 217 may be models, which represent the geometric relationship of modeled components, and, in the case of dynamic physical models, their interactions. In certain embodiments, the nD models 217 may be linear (i.e. one-dimensional), planar (i.e. two-dimensional), spatial (i.e. three-dimensional), and/or multi-dimensional (i.e. n-dimensional). The MS models 218 may be models, which are mathematical and/or statistical models. For example, a sample MS model 218 may be a Bayesian network model.

The system 100 may include a plurality of evaluators 220 (can also be executors 220), which may be one or more software modules executing within a software application that conducts the operations of the system 100. In certain embodiments, the evaluators 220 may comprise a combination of hardware and software. The evaluators 220 may comprise a plurality of processes that generate data and information based on their interactions with a given application under evaluation 230. In certain embodiments, there may be several types of evaluators 220. A first type of evaluator 220 may be a composer 221, which may be configured to execute a series of steps on the application under evaluation 230 to generate results, which may be composed into one or more outputs. In certain embodiments, the composer 221 may execute a set of steps on the application under evaluation 230, while capturing screenshots or screen outputs for conversion into a media content video by a data transformer 232 of the system 100. For example, the media content video may be a training video to assist a user with navigating through various features and functions of the application under evaluation 230. As another example, the media content may be a problem recreation and/or debugging video to assist a developer or tester to debug a problem with the application under evaluation 230. In this scenario, the problem creation and/or debugging video may document the steps to recreate the problem that occurred in the application under evaluation 230 so that the developer or tester may readily perceive and/or visualize how the problem occurred. As yet another example, the media content may be a test verification video for facilitating the historical verification of tests for auditing purposes. When the test verification video is being utilized for auditing the verification of tests that have been run, the test verification video may be a video that proves that a test was executed and that the test was passed by the application under evaluation 230. Notably, any other media content may be generated by the composer 221 for any suitable and/or desired purpose as well. In certain embodiments, a composer 221 may execute a series of steps on an application under evaluation 230, while capturing statistical information, which may be utilized by an analysis engine 239 to generate analyses 243. In certain embodiments, a composer 221 may be configured to observe inputs into the application under evaluation 230 and outputs generated from a validator 222 and/or explorer 223 and generate composed output results. A second type of evaluator 220 is a validator 222, which may be configured to execute a series of steps on the application under evaluation 230 test-modeled functionality and/or to evaluate hypotheses generated by the system 100 as they relate to the functionality of the application under evaluation 230. The validators 222 may assist in developing high confidence agglomerated models 208 based on the series of steps executed or otherwise. In certain embodiments, the system 100 may require zero or more validators 222 to operate because trivial or special use cases exist where sufficient model confidence may be obtained without utilizing the functionality of the validators 222. A third type of evaluator 220 is an explorer 223, which may be configured to execute a series of steps on an application under evaluation 230 to dynamically explore and model the application under evaluation 230 in conjunction with the dynamic model discovery module 206. In certain embodiments, the explorers 223 may assist in the discovery and creation of models corresponding to the application under evaluation 230, correlating with one or more functions and/or features of the application under evaluation, or a combination thereof.

The system 100 may also include a controller 224, which may be software, hardware, or a combination thereof. The controller 224 may be configured to control the application, hardware, and/or components of the system 100 that facilitate the functionality of the system 100. In certain embodiments, the controller 224 may govern the high-level behavior of the system 100 itself, and may be configured to start the operation of the system 100, start subsystems of the system 100, and/or stop the operation of the system 100 and subsystems. In certain embodiments, the controller 224 may manage the configuration of the system 100, along with the configuration of the application under evaluation 230. The controller 224 may also direct the flow of control or flow of data between the various modules of the system 100, such as, but not limited to, the static model discovery module 200, the model change management module 204, the dynamic model discovery module 206, the evaluators 220, the data transformers 232, any other module or software in the system 100, or any combination thereof. In certain embodiments, the controller 224 may allocate and direct computing resources within the system 100. For example, the controller 224 may allocate and direct computing resources such as, but not limited to, memory (e.g. random-access memory), processors, and/or network resources. In certain embodiments, the controller 224 may also allocate and direct virtual computing resources, such as, but not limited to, containers, virtual machines, virtual processors, virtual memory (e.g. virtual random-access memory), cloud resources, virtual networks, other virtual resources, or any combination thereof. In certain embodiments, the controller 224 may direct the priority, the level of parallelism, and/or redundancy of various components in the system 100. In further embodiments, the controller 224 may control the backup and recovery of data and information stored and/or traversing the system 100. In still further embodiments, the controller 224 may be configured to control the operation of any program, hardware, and/or system associated with the system 100.

In addition to the controller 224, the system 100 may also include a learning engine 226. The learning engine 226 may be software, hardware, or a combination thereof, and may be supported by any suitable machine learning and/or artificial intelligence algorithms. The learning engine 226 may be a system that determines patterns and/or associations in behaviors or objects, such as, but not limited to, behaviors and/or objects of an application under evaluation 230 that is being analyzed and/or tested by the system 100. The learning engine 226 may allow for improved efficiency and accuracy of the system 100, while enabling more advanced static model discovery modules 200, evaluator 220 modules, and/or data transformer 232 modules. In certain embodiments, the learning engine 226 may allow for supervised learning, which may be supported through the user interface 228 that may be accessed and interacted with by the first user 101, the second user 110, and/or n-other users. For example, the learning engine 226 may receive inputs from the first and/or second users 101, 110 that endorse one or more models, test validation, perform sentence tagging in documents, etc. that may be utilized to enhance the agglomerated models 208, the operation of the system 100, and the knowledge base of the system 100. Additionally, the learning engine 226 may support unsupervised learning by automatically feeding validated test results from the evaluators 220 and statistical, performance-based, evaluator 220 results back through the system 100 as they are generated. In certain embodiments, the learning engine 226 may be configured to associate confidences or confidence levels with determined patterns and/or associations determined by the learning engine 226. Notably, the learning engine 226 may increase the confidence value of a particular pattern as the pattern is detected more frequently by the learning engine 226 over time, or lower the confidence value of the particular pattern if the pattern is contradicted in some regard or is not detected frequently over time. In certain embodiments, the confidence values may range from 0.0 to 1.0, however, any suitable scale may be utilized according to the present disclosure. In certain embodiments, the first user 101 and/or the second user 110 may be allowed to provide inputs via the first and/or second user devices 102, 111 to directly alter the confidence values. In certain embodiments, the first user 101 and/or the second user 110 may alter the confidence values via user interface 228 of the software application that performs the operative functions of the system 100. The user interface 228 may be made accessible to the first and/or second user devices 102, 111. In certain embodiments, the learning engine 226 may train or improve a model, a parameter, weight, a dictionary, a threshold, a confidence, or a filter associated with the generating of a future token, wherein the training or improving is based on feedback, test results, an internal source, an external source, the application under evaluation, hypothesis testing, hypothesis testing results, an analyses, a confirmation or rejection of the token, the token, another token related to the token, another token, any other source, or combination thereof.

A sample use-case scenario may be utilized to illustrate how the first user 101 may adjust a confidence value. In this use-case scenario, the learning engine 226 may determine that each employee having an account being generated by an application under evaluation 230 has a phone number with a 0.95 confidence value. The first user 101 may review the learning engine's 226 determination and verify that the determination is accurate via an input transmitted via the first user device 102. Based on the first user's 101 verification, the learning engine 226 may increase the confidence value from 0.95 to 0.99 or even to 1.00 for an employee having a phone number. As another use-case scenario, the system 100 may determine from information gathered from the static model discovery module 200 that a user should not be able to change their date of birth in a user account created by an application. This determination, however, may be deemed as inaccurate or wrong by the first user 101. In this scenario, the learning engine 226 may alter the confidence value attributed to a user not being able to change the date of birth down to 0.01 or even to 0.00 from a higher confidence value originally determined by the learning engine 226. In contrast, the confidence value attribute to the user being able to change the date of birth may be increased by a certain amount by the learning engine 226.

The software application that facilitates the functional operations of the system 100 may include a user interface 228. The user interface 228 may be a graphical user interface, which may allow the first and/or second users 101, 110 and devices to interact with the software application performing the operations of the system 100. In certain embodiments, the user interface 228 may be a text-based terminal/command interface. The user interface 228 of the application may have both visual and auditory elements as output, and may be configured to receive keyboard inputs, mouse inputs, microphone inputs, screen inputs (e.g. touchscreen inputs) any type of inputs, or any combination thereof, from a user and/or device interacting with the user interface 228. In certain embodiments, the user interface 228 may be adapted to receive inputs and/or send outputs via user interface elements specifically configured for people with disabilities or challenging circumstances. In certain embodiments, an application programming interface (API) or software development kit (SDK) may be utilized for remote computers to connect with the system 100, and may input or output information as needed.

The system 100 may be configured to access, test, and/or interact with one or more applications under evaluation 230. An application under evaluation 230 may be a software application that the first and/or second user 101, 110 may wish to analyze and/or test by utilizing the system 100. In certain embodiments, instead of a user requesting that an application under evaluation 230 be analyzed or tested, a device, robot, and/or program may request the analyzing and testing of the application under evaluation 230. Based on interactions between the system 100 and an application under evaluation 230, information and data may be obtained to facilitate the creation of one or more models of the agglomerated models 208, the updating of one or more models of the agglomerated models 208, the verification of one or more models of the agglomerated models 208, or any combination thereof. In certain embodiments, the applications under evaluation 230 may be accessed, tested, and explored by utilizing the evaluators 220, which include the composers 221, validators 222, and explorers 223.

In certain embodiments, the system 100 may include a plurality of data transformers 232. In certain embodiments, the data transformers 232 may be software, hardware, or a combination thereof. The data transformers 232 may be configured to take one or more inputs, such as, but not limited to, the agglomerated models 208 and information and data obtained from the evaluators 220 to generate a useful output, such as by manipulating the data and information in the inputs. In certain embodiments, the system 100 may include any number of data transformers 232, which may include code generators 233, application compilers 234, model interpreters 235, translators 236, media converters 237, report generators 238, and analysis engines 239. The code generators 233 may be configured to access model inputs from the agglomerated models 208 and one or more objectives obtained from the evaluators 220, other data transformers 232, or even the code generators 233 themselves to create software code that satisfies the objectives. In certain embodiments, the software code generated by the code generators 233 may be utilized to fix a defect detected by the system 100 in an application under evaluation 230. In certain embodiments, the generated software code may be utilized to add, change, and/or remove functionality of the application under evaluation 230. In certain embodiments, the generated software code may be utilized to test or exercise the application under evaluation 230. In further embodiments, the generated code may be internal to the application under evaluation 230 or external to the application under evaluation 230, and the generated code may be related to the application under evaluation 230 or the generated code may benefit other software applications outside of the application under evaluation 230, such as applications that support the environment of the application under evaluation 230 (e.g. cloud programs, SaaS, operating systems, related applications, etc.). In certain embodiments, the generated code may be written and/or compiled by utilizing any suitable programming language, such as, but not limited to C, C++, Java, Python, and/or other language. In certain embodiments, the generated code may be generated at a high level, such as through the use of scripting languages, or low level, such as through the use of assembler/assembly languages. In certain embodiments, the generated code may be software that may enhance, replace, and/or modify the software application (including any modules) supporting the operation of the system 100. For example, the generated code may be utilized to update a start-up script based on execution patterns of the application under evaluation 230 or usage patterns of users of the application under evaluation 230.

The application compilers 234 may utilize outputs from the code generators 233 and compile the generated code into one or more computer applications/programs 241. In certain embodiments, the application compilers 234 may utilize inputs from the agglomerated models 208 and data from the evaluators 220, and incorporate such inputs and data when compiling software code. Inputs may also include compiler options, such as, but not limited to optimizations, performance goals, goals relating to the operation of the application under evaluation 230, configuration options, etc. The application compilers 234 may include target models (i.e. selected) of the agglomerated models 208 to improve directly or indirectly, such as by improving the functional features of the application under evaluation 230. The model interpreters 235 may be utilized in interpreting the models in the agglomerated models 208. In certain embodiments, the model interpreters 235 may comprise software, hardware, or a combination of hardware and software. An example use-case scenario of using a model interpreter 235 involves the use of a LM model 215. For the LM model 215, there may need to be a model interpreter 235, which is configured to understand the LM model 215 and how it relates to the application under evaluation 230, or how the application under evaluation 230 is understood by the evaluators 220. For example, the LM model 215 may tag or mark parts of speech or concepts found in paragraphs of text obtained from the internal or external data sources 201, 202, and the model interpreter 235 may be configured to comprehend the parts of speech as it pertains to the application under evaluation 230. In this case, the comprehension by the model interpreter 235 may comprise understanding an application page title, an application widget (e.g. text box, menu, pull down menu, radio button, etc.), an application user or role, an application message (e.g. alerts, emails, highlighted text, etc.), and/or any action in the application under evaluation 230 (e.g. create, read, update, delete, navigate, click, select, choose, enter, etc.)

The translators 236 may be software, hardware, or a combination thereof, and may take a model of the agglomerated models 208 or outputs from the evaluators 220, and convert them into a form that is more useful for a given task. As an example, a translator 236 may take a FSM model 209 and convert the FSM model 209 from a representation in a database 155 to a graphical representation, which may be more readily understood by the first or second user 101, 110. For example, the states of the FSM model 209 may be represented by circles or tiles, which further represent or illustrate a portion of the specific application that they represent. In certain embodiments, transitions between states may be shown as lines, which may have effects, which may imply characteristics of the transitions. Such effects may include adjusting thickness of a line to show popularity of use, a number of paths, complexity, or any other attribute. As another example, a translator 236 may take a LM model 215 or output from the evaluators 220, and convert them from English language to another language, such as Chinese or any other desired language, and vice versa. The translators 236 may also be utilized to translate from one encoding to a second encoding, such as from ASCII to Unicode. As yet another example, the translators 236 may take a SQL database (e.g. database 155) and convert it to a NOSQL database. Any translated information, programs, content, or output from the translators 236 may be fed into the agglomerated models 208, the evaluators 220, and/or the outputs 240 for further use by the system 100.

The media converters 237 of the system 100 may be configured to utilize outputs of the evaluators 220 and the agglomerated models 208 and convert them from a first form to a second form. In certain embodiments, the media converters 237 may be software, hardware, or a combination thereof. As an example of the operation of the media converters 237, the media converters 237 may take a textual description of the application under evaluation's 230 actions and steps, and convert them into listenable audio, which may be particularly useful to those with visual impairment. For those with hearing impairment, the media converters 237 could convert audio into text or images, which may be utilized for closed caption purposes in a presentation. The report generators 238 of the system 100 may be hardware, software, or a combination thereof, and may be utilized to create reports 242 based on the outputs of models of the agglomerated models 208, outputs from the evaluators 220, outputs from the data transformers 232, outputs from the application under evaluation 230, along with any other outputs received by the system 100. As an example, the report generators 238 may generate reports 242 that include the results of test cases executed on the application under evaluation 230 by the system 100. In certain embodiments, the outputs may simplify, summarize, and/or otherwise organize the data in the outputs. The analysis engines 239 may also comprise hardware, software, or a combination thereof. The analysis engines 239 may analyze the outputs of the agglomerated models 208, the outputs of the evaluators 220, the outputs of the data transformers 232 and any other outputs received by the system 100 to take an intelligent action. An intelligent action may include identifying a noteworthy condition based on the outputs analyzed, for example. The condition may be output in an analysis 243, and, in certain embodiments, the condition may be a defect detected in a test result 246. In certain embodiments, the condition may be based on the performance, popularity, complexity, or any other metric of a state or transition of a FSM model 209.

In addition to the functionality provided by the various components of the system 100 described above, the system 100 may also generate a variety of outputs 240 based on use of the components. The outputs 240 generated by the system 100 may include, but are not limited to, computer programs 241, reports 242, analyses 243, system models 244, computer code 245, test results 246, and test data 247. The computer programs 241 may be sets of instructions, which may be executed by various components of the system 100 to perform one or more tasks. As described above, the application compilers 234 may utilize outputs from the code generators 233 and compile the generated code into one or more computer applications/programs 241. The created computer programs 241 may be utilized to supplement functionality of an application under evaluation 230, integrated into an application under evaluation 230, replace functionality of the application under evaluation 230, modify functionality of the application under evaluation 230, or any combination thereof. The reports 242 may be generated by the report generators 238 of the system 100, and the reports 242 may be generated based on the outputs of models of the agglomerated models 208, outputs from the evaluators 220, outputs from the data transformers 232 outputs from the application under evaluation 230, along with any other outputs received by the system 100. The reports 242 may combine information from the outputs in a visual format, audio format, a format understandable by those with hearing and visual impairments, or any combination thereof. As an example, a report 242 may visually show all the successful paths that the evaluators 220 were able to take while testing the application under evaluation 230, along with any defects and/or any potential conflicts detected while exploring the functionality of the application under evaluation 230. Of course, any type of report 242 may be generated by the system 100, and a report 242 may include any information generated, received, stored, transmitted, and/or manipulated by the system 100.

The analyses 243 may be a type of output 240 of the system 100, which may identify a noteworthy condition, such as a condition associated with an application under evaluation 230 (e.g. a defect or conflict), a condition associated with one or more components of the system 100, any type of condition, or any combination thereof. The condition may be output in the analysis 243, and may be generated by the analysis engines 239. The system models 244 that may be output by the system 100 may comprise an architecture and/or behavior of the system 100 or any other system that the system 100 interacts with. For example, a system model 244 may be a model that describes an architecture or behavior of the application under evaluation 230, functions and products related to the application under evaluation 230, a computing environment associated with the application under evaluation 230, and/or an application related to the application under evaluation 230. In certain embodiments, the system model 244 may be one or more models from the agglomerated models 208. The computer code 245 may be an output 240 that comprises instructions for executing a task, such as on a processor of one or more of the components of the system 100. The computer code 245 may be generated by the code generators 233 and may be compiled by the application compilers 234. In certain embodiments, the computer code 245 may be obtained from the agglomerated models 208, the evaluators 220, and/or the data transformers 232. In certain embodiments, the computer code 245 may be utilized to supplement functionality of an application under evaluation 230, integrated into an application under evaluation 230, replace functionality of the application under evaluation 230, modify functionality of the application under evaluation 230, modify functionality of modules and applications supporting the functionality of the system 100, or any combination thereof.

The test results 246 of the outputs 240 may be results of executing various software, hardware, and/or application tests on components of the system 100, the application under evaluation 230, or any combination thereof. The tests results 246 may be obtained based on tests and/or analyses conducted by the validators 222, the analysis engines 239, any of the evaluators 220, and/or any of the data transformers 232. In certain embodiments, the test results 246 may include information relating to a test, such as, but not limited to, an identifier identifying the type of test executed, inputs inputted into the test, outputs generated from the test, performance metrics associated with the test, or a combination thereof. In certain embodiments, the test results 246 may indicate whether the test was successful or a failure. If a failure occurred, additional data and metadata may be included with the test results 246, such as, but not limited to, call stacks, offsets within computer programs, source code, addresses of objects (e.g. objects within the application under evaluation or other components being tested), actual objects, memory dumps, screenshots, and/or any other information that may assist with failure remediation and/or analysis. Test data 247 may be any information that pertains to the assessment of software, hardware, applications, or any combination thereof, that the system 100 interacts with. In certain embodiments test data 247 may include inputs and outputs of tests, executable and/or manual test steps, expected results of tests, actual results of tests, functional results of tests, performance results of tests, or any combination thereof. In certain embodiments, test data 247 may include metadata describing the tests, such as, but not limited to, how many tests exist, the priority or ordering of tests to be utilized, computer resources (e.g. memory resources, processing resources, etc.) assigned to and utilized for executing certain tests, instructions or media content (e.g. pictures, video, audio, etc.) describing the application under evaluation 230, any other information, or a combination thereof.

Operatively, the system 100 may operate according to the following exemplary use-case scenarios. Of course, the system 100 may be utilized for any suitable use-case scenario and the scenarios described below are merely for illustration purposes. In a first use-case scenario as shown in FIG. 3, the process of nounization is illustrated. For the purposes of this use case, the input received by the system 100 to process and analyze is the sentence: "The parameter Is Valid shows the current status." Two code blocks are shown in FIG. 3. Code block 302 shows how the sentence would be processed without using the system 100 and code block 304 shows how the sentence would be processed with using the system 100. In code block 302, DT means determiner, NN means noun common singular, JJ means adjective, NNS means noun common plural, VBZ means verb present tense third person singular, and relation means a summarization of a sentence that shows key structures including the subject, action, and object of the sentence (e.g. verb (subject, object)). As is shown, in code block 302 (not using system 100), the word "The" is tagged as a determiner, the word "parameter" is tagged as a noun, the word "is" is tagged as a verb, the word "valid" is tagged as an adverb, the word "shows" is tagged as a noun common plural, the word "the" is tagged as a determiner, the word "current" is tagged as an adjective, and the word "status" is tagged as a noun common singular by the part-of-speech tagger 144. Additionally, in code block 302, the subject is "parameter" and the relations are Is(parameter, Valid) and show(parameter, current_status). In code block 302, "Is Valid" is actually supposed to be a multiword concept comprising a parameter. However, in code block 302, the words "is" and "valid" are tagged as the incorrect parts of speech, along with the word "shows".

Code block 304, which involves utilizing the functionality of the system 100, resolves the aforementioned issues with tagging parts of speech. In code block 304, part-of-speech tagger 144 (or tokenizer 158 and/or any other component of the system 100) identifies the multiword concept "Is Valid" based on the capitalization of the words "Is" and "Valid" in the sentence, based on the fact that "Is" and "Valid" are adjacent to one another, and/or based on the words "Is" and "Valid" following the word "parameter". In certain embodiments, multiword concept "Is Valid" may be identified as a parameter by identifying it in a list of parameters, which may be provided in an API document, for example. Once the part-of-speech tagger 144 identifies the multiword concept of "Is Valid", the part-of-speech tagger 144 (and/or the natural language processing engine 143) replaces the multiword concept with the token "NlpId_27", which is to be tagged as a noun. The part-of-speech tagger then begins tagging the words in the sentence after the words "Is Valid" are replaced with the token. Based on the foregoing, the part-of-speech tagger 144 correctly tags the word "The" as a determiner, the word "parameter" as a noun common singular, the token "NlpId_27" as a noun, the word "shows" as a verb, the word "the" as a determiner, the word "current" as an adjective, and the word "status" as a noun common singular. Additionally, in code block 304, the intermediate subject is the token, "NlpID_27", the intermediate relation is show(parameter NlpId_27, current_status), the final subject is "Is Valid" (after the token "NlpId_27" is replaced with the original words from the original input text), and the final relation is show(parameter_Is_Valid, current_status). Thus, the part-of-speech tagger 144 correctly tagged the parts of speech based on the identified multiword concept "Is Valid." The part-of-speech tagger 144 can then replace the token with the original text "Is Valid" now that the taggings have been performed and the sentence may be processed as necessary by the system 100.

Nounizations may be performed for any types of parameter names and/or multiword concepts. Notably, the system 100 may separate individual words by blanks, periods, underscores, (e.g. License.ID) etc. in various parts of a given document. For the natural language processing engine 143 and/or part-of-speech tagger 144 to understand the words, the system 100 may remove the separating character (if not a blank), for example. Then the words may be nounized into a single token. Lastly, it is processed in its sentence with the context of the token being perceived as a noun (though other part of speech perceptions are contemplated). Sample parameter names and/or multiword concepts that may be nounized may include, but are not limited to, "Achieved date", "License id", "Proficiency level id", "From month", "To month", "Is active", "Is internal", "Is important", "Is urgent", "Is budgeted", "Contact info address state code", "Contact info address country code", "Screening name", "Is shared with everyone", "Recommendation requested at", "Recommendation recommended at", "created at", "deleted at", "compensation is fulltime", "compensation is salaried", and "motivation criteria Is Required".

In a second use-case scenario as shown in FIG. 4, the process of verbization is illustrated. For the purposes of this use case, the input received by the system 100 to process and analyze is the sentence: "The product is task scheduling and monitoring for security threats." The intent of the sentence is that there is an active mode that a product can be put into called "Task scheduling and monitoring", which may be known from an online software product manual. Two code blocks are shown in FIG. 3. Code block 402 shows how the sentence would be processed without using the system 100 and code block 404 shows how the sentence would be processed with using the system 100. As is shown, in code block 402 (not using system 100), the word "The" is tagged as a determiner, the word "product" is tagged as a noun common singular, the word "is" is tagged as a verb, the word "task" is tagged as a noun common singular, the word "scheduling" is tagged as a noun, the word "and" is tagged as a coordinating conjunction, the word "monitoring" is tagged as a noun common singular, the word "for" is tagged as a preposition, the word "security" is tagged as a noun common singular, and the word "threats" is tagged as a noun common plural. Additionally, in code block 402, the subject is "product", the action is "be" (based on "is"), the object is "task scheduling", and the relations are be(product, task scheduling) and scheduling (product, security threat). Based on the foregoing, the words in the set of words "is task scheduling and monitoring" are tagged incorrectly.

Code block 404, which involves utilizing the functionality of the system 100, resolves the aforementioned issues with tagging parts of speech. In code block 404, part-of-speech tagger 144 identifies the multiword concept "is task scheduling and monitoring" based on the functionality provided by the system 100. In doing so, the part-of-speech tagger 144 (and/or the natural language processing engine 143) replaces the multiword concept "is task scheduling and monitoring" with the token "tokening", which is to be tagged as a verb. The token "tokening" may be chosen because it ends in "ing" and, as a result, would signify that the token should be tagged as a verb. The part-of-speech tagger 144 then begins tagging the words in the sentence after the words "is task scheduling and monitoring" are replaced with the token "tokening". In code block 404, the subject is "product", the intermediate action is "tokening" ("tokening" being the token replacing "is task scheduling and monitoring"), the object is "security threats", the intermediate relation is tokening (product, security threats), the final action is "task scheduling and monitoring", and the final relation is task scheduling and monitoring(product, security threats) As a result, the part-of-speech tagger 144 correctly tags the word "The" as a determiner, the token "tokening" as a verb, the word "for" as a preposition, the word "security" as a noun common singular, and the word "threats" as a noun common plural. The part-of-speech tagger 144 can then replace the token with the original text "is task scheduling and monitoring" now that the taggings have been performed and the sentence may be processed as necessary by the system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, parsing text and information inputs received and/or obtained from sources; identifying sets of words in the inputs that correspond to parameters, concepts, ideas, etc.; consulting contextual information from other sources of information to supplement the identification of the sets of words; generating tokens to replace the sets of words; scoring the tokens and/or sets of words generated and/or selected by the system 100; selecting optimal sets of words and tokens (e.g. based on score or other factors); replacing, to create a modified input, one or more sets of identified words with tokens that indicate the correct part-of-speech to be tagged by the part-of-speech tagger 144; passing the modified input including the tokens to the part of speech tagger 144 to tag the parts of speech of each word and the token in the modified input; replacing the tokens with the original text that the tokens were utilized to replace; analyzed the tagged part of speech to generate analyses and interpretations associated with the words in the input; scoring, weighing, checking, and/or filtering the analyses and/or interpretations; conducting learning based on the information obtained from the analyses and interpretations; updating one or more agglomerated models 208 utilized by the system 100 based on the analyses, interpretations, and/or learning; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-2 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a natural language processing engine 143, a part-of-speech tagger 144, a server 150, a server 160, and a database 155. However, the system 100 may include multiple first user devices 102, multiple second user devices 111, multiple communications networks 135, multiple servers 140, multiple natural language processing engines 143, multiple part-of-speech taggers 144, multiple servers 150, multiple servers 160, multiple databases 155, or any number of any of the other components inside or outside the system 100. Similarly, the system 100 may include any number of internal data sources 201, external data sources 202, static model discovery modules 200, model change management modules 204, dynamic model discovery modules 206, agglomerated models 208, evaluators 220, data transformers 232, controllers 224, learning engines 226, user interfaces 228, applications under evaluation 230, any other component, program, or device of the system 100, or a combination thereof. In certain embodiments, substantial portions of the functionality and operations of the system 100 may be performed by other networks and systems that may be connected to system 100. In certain embodiments, the architecture of the system 100 may relate key functional elements, while remaining agnostic as to the technical processes employed within each functional element of the system. For example, deep neural networks, natural language processing, Bayesian analysis, and a variety of other techniques may be employed within any of the primary functional elements (static model discovery module 200, model change management module 204, dynamic model discovery module 206, evaluators 220, and data transformers 232) as well as within the cross-functional elements of the system 100 (controller 224, learning engine 226, and user interface 228). In certain embodiments, the system 100 may operate in conjunction with a single application under evaluation 230 or across multiple applications under evaluation 230. In certain embodiments, the system 100 may operate in a multi-threaded environment with multiple instances of each module, program, and/or component of the system 100 operating in parallel. Such parallel operations may be limited, in certain embodiments, by predetermined limits or ratios, performance metrics and statistics, hardware availability, user interfaces, external interfaces, and access limitations associated with the application under evaluation 230.

Figure 5:
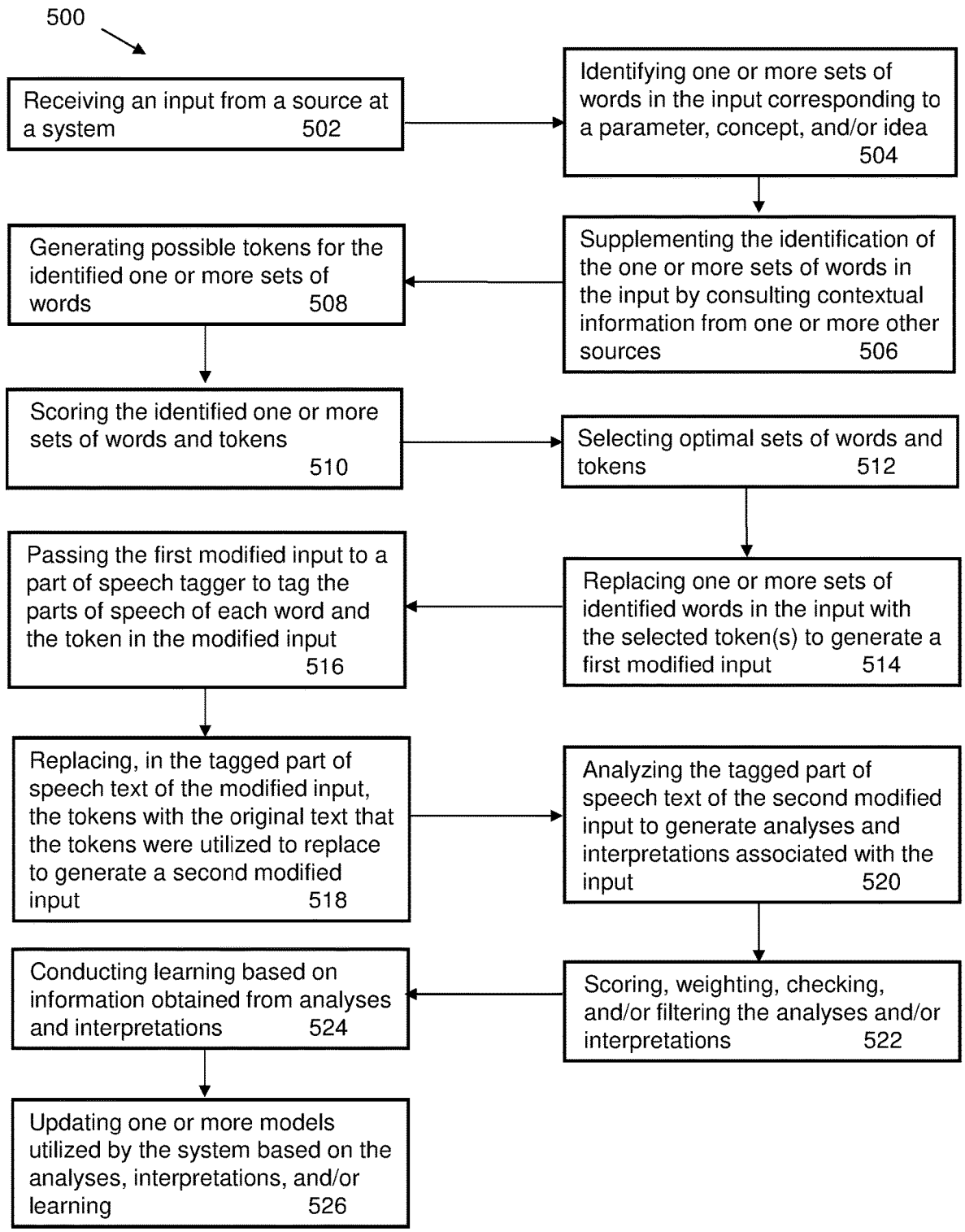
FIG. 5 is a flow diagram illustrating a sample method for providing intelligent part of speech processing of complex natural language according to an embodiment of the present disclosure.

As shown in FIG. 5, an exemplary method 500 providing intelligent part of speech processing of complex natural language is schematically illustrated. For the purposes of method 500, a user, such as first user 101, or a device, such as first user device 102, may be interested in having text, speech, or other information parsed and processed by the system 100. In certain embodiments, the parsing and/or processing may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any combination thereof, or by utilizing any other appropriate program, network, system, or device. At step 502, the method 500 may include receiving an input (or inputs) from a source (or multiple sources) at the system 100. In certain embodiments, the receiving of the input may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any combination thereof, or by utilizing any other appropriate program, network, system, or device. For the purposes of this example, the input may be received by the natural language processing engine 143 and/or the part-of-speech tagger 144. The inputs may be from documents, paragraphs, sentences, phrases, video content, audio content, text content, any other type of content, or any combination thereof.

At step 504, the method 500 may include examining the input and identifying one or more sets of words (e.g. through nounization, verbization, adverbizations, adjectivizations, etc.) occurring in the input. For example, in the context of identifying a set of words to be nounized (i.e. words to be replaced by a token and to be treated as a noun by the system 100), the set of words may be identified by one or more sets of capitalized words occurring in the input, sets of nouns or compound nouns, and words adjacent thereof, including other nouns, adjectives, prepositions, pronouns, or any other type of words classification. In certain embodiments, the one or more sets of words to be identified may correspond with a parameter (e.g. a parameter utilized by a software program or other parameter), a concept, an idea, a title, or any other grouping of words. In an example use-case of the method 500, the input at step 502 may be the following sentence, which may be obtained from a document made accessible to the natural language processor 143: "The parameter Is Valid shows the current status." In step 504, the method 500 may include identifying the set of words "Is Valid" to be nounized because these words may be detected by the natural language processing engine 143 as a set of capitalized words that are adjacent to one another in the input and may correspond to a parameter. In certain embodiments, the method 500 may include altering or rewriting the text in the input other than the set of words to be nounized to better construct the text for parsing by the part-of-speech tagger 144 of the system 100 if the text does not add to the meaning of the sentence in the input. For example, the system 100 may remove the word "parameter" from the input text since it is adjacent to the set of words to be nounized, namely the words "Is Valid". As a result, the input may be revised to state: "The Is Valid shows the current status." In certain embodiments, the set of words to be nounized may be moved within the text of the input such that there is a greater likelihood that the part-of-speech tagger 144 tags the words in the text as expected. As an example, if we have the nounized word "token1" followed by the word "parameter", the part-of-speech tagger 144 may tag "token1" as an adjective. However, if the system 100, reorders the text to have the word "parameter" followed by "token1", then the part-of-speech tagger 144 may be more likely to tag "token1" as a noun. In certain embodiments, the examining of the input and/or the identification of the one or more sets of words may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any combination thereof, or by utilizing any other appropriate program, network, system, or device.

At step 506, the method 500 may include consulting contextual information provided by one or more sources other than the source that provided the input in step 502 in order to further aid in the identification of the one or more sets of words from step 504. For example, at step 506, the system 100 may access and/or receive documents and/or files from sources that may include, but are not limited to, help text, API/SDK/Swagger documents, software manuals, hardware manuals, software requirements, hardware requirements, agile stories, software test cases, hardware test cases, release notes, any other source of text and/or information, or any combination thereof. In certain embodiments, dictionaries and/or domain specific data or glossaries, speaker and/or author tagged data, and/or any other data of data may be consulted by the system 100 to supplement the identification of the one or more sets of words to be nounized (or verbized, adjectivized, adverbized, or other part-of-speech associated with words that may be tokenized). In certain embodiments, at step 506, the method 500 may also include having the system 100 consult software programs and products, including the application under evaluation 230, software in an immediate computing environment of the system 100 and/or any components of the system 100 (e.g. natural language processing engine 143, part-of-speech tagger 144, the tokenizer 158, the segmenter 159, and/or any other component in FIG. 1 and/or FIG. 2), other software not being evaluated by the system 100, remote internet software (e.g. in external network 165 or elsewhere), cloud software (e.g. software-as-a-service software, other software, etc.), any other software, or any combination thereof. The system 100 may analyze these software and hardware sources of text and information and screens of the programs may be scraped by the system 100 to see details of various computer screens, pages, labels, widgets, artifacts, and/or APIs/SDKs accessed to learn more about the system's 100 use of multi-word parameters, concepts, and/or ideas. In still further embodiments, the system 100, at step 506, may consult and access any of the agglomerated models 208 as disclosed herein for further insight relating to the one or more sets of words identified. In certain embodiments, the consulting at step 506 may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, the external network 165, the agglomerated models 208, any component in FIG. 2, any combination thereof, or by utilizing any other appropriate program, network, system, or device.

Once the one or more sets of words to be nounized and/or supplementary identification information is performed at step 506, the method 500 may proceed to step 508. At step 508, the method 500 may include generating possible tokens to replace the one or more sets of words to be nounized (or verbized, adjectivized, adverbized, or other part-of-speech associated with words that may be tokenized). In certain embodiments, the tokens may be generated according to any desired criteria. In certain embodiments, the tokens may be generated to correlate to the particular words, phrases, concepts, particular sets of words and/or concepts in the one or more sets of words to be nounized. For example, if a particular input contains the set of words "contact info address state code", "contact address state code", or "contact's state code", each of these sets of words may be mapped to the same token generated in step 508. In certain embodiments, tokens may be generated and/or constructed such that they appear as a noun (or other desired part of speech), such as by capitalizing at least a first letter, number, or character of the token to mimic a proper noun, and/or by ending the token word in a manner that typically signifies a noun, such as by ending the token word with the suffix "tion" or "sion." In another example, instead of using the token to nounize a set of words from an input, the system 100 may choose to verbize the set of words. In such a scenario, the generated token may be constructed to end in an "ing", "ed", or other verb ending to signify that the token for the set of words should be tagged as a verb rather than whatever part of speech the individual words in the set of words are. As yet a further example, if the token to be generated is supposed to appear as an adverb, the token may be constructed to end in the letters "ly". In certain embodiments, tokens may be generated to have a word or words which match the meaning (e.g. English or other language meaning) of the words that the token is to replace. For example, if the set of words in the input to be nounized is "contact info address state code", the token generated by the system may be "statecode" or simply "code". In other embodiments, a number or character sequence may be inserted or appended to the token to ensure the token is unique (e.g. "NLP123" or "TokenA"). In certain embodiments, the generating of the token at step 508 may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device.

Once the token or tokens are generated, the method 500 may proceed to step 510, which may be an optional step. At step 510, the sets of words to be nounized (or verbized, adjectivized, adverbized, or other part-of-speech associated with words that may be tokenized) may be scored. The scoring may be based on various quality measures, such as, but not limited to, the confidence in the nounization, which may be based on the evidence the system 100 extracted the nounization from (e.g. a web page that the system 100 explored at step 506 may have a label that implies higher confidence of that label, whereas just a set of nouns may have a lower confidence.) The set of words to be nounized may optional be passed through the natural language processing engine 143 and/or the part-of-speech tagger 144 to assist in the understanding the words in the set of words and to assist in the scoring process. In certain embodiments, scoring may be based on the number of words to be nounized, the descriptiveness of the words to be nounized, the genericity of the words to be nounized, the number of times the system 100 found the set of words to be nounized, any type of criteria, or any combination thereof. In certain embodiments, the scoring may be via a scale using numbers, the scoring may be via word terms indicating various degrees of accuracy for the nounizations, any other scoring system, any type of metric, or a combination thereof. In certain embodiments, the scoring may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device.

At step 512, the method 500 may include selecting the most likely or optimal sets of words and tokens (i.e. nounizations, adverbizations, adjectivizations, verbizations, or other part-of-speech associated with words that may be tokenized) from a set of candidate sets of words and tokens. In certain embodiments, the most likely sets of words and tokens may be the highest scoring sets of words and tokens from step 510, however, in other embodiments, the sets of words and tokens may be selected based on various rules. For example, there may be a rule to select a particular nounization if there is only one set of words and token (i.e. one nounization), or a rule to choose the longest set of words to be nounized, a rule to only utilize scoring if there is a tie sets of words having the same length, any other rule, rules relating selecting nounizations based on the concepts present in the nounizations, or any combination thereof. In certain embodiments, the selection of the sets of words and tokens may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device. Once the optimal set or sets of words and tokens are selected at step 512, the method 500 may proceed to step 514. At step 514, the method 500 may include replacing the one or more sets of words from the input with the tokens. For example, a nounized set of words from the original text in the input may be rewritten to be replaced with the corresponding generated nounized token in the text to create a modified version of the text. In certain embodiments, identified pronouns that refer to the nounized set of words in the text may also be replaced as well. In certain embodiments, the replacing may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device.

The modified/rewritten text of the input may be passed to the part-of-speech tagger 144 of the system 100 for processing at step 516. The part-of-speech tagger 144 may proceed to mark or tag the parts of speech of each word in the modified text. For example, using one of the examples above, the original text may have been "The parameter Is Valid shows the current status" and the modified version of this text including the token (Nlpid) for "Is Valid" may be written as follows: "The parameter Nlpid shows the current status". The part-of-speech tagger 144 may tag each of the words in the rewritten text with the corresponding parts of speech. In the example above, the token Nlpid would be tagged as a noun in the modified text, whereas the part-of-speech tagger 144 would have tagged "Is Valid" as being a verb and an adjective in the original text. In certain embodiments, other classifications may be marked and/or tagged onto each word in the modified text. For example, the part-of-speech tagger 144 may tag classifications, such as, but not limited to, date, money, named entity (i.e. natural language processing technology that identifies names of persons, places, or things in the text of an input), type of subject matter associated with the word (e.g. concept), tense of the word, whether the word is plural or singular, whether the word is a proper noun or not, any other classifications, or any combination thereof. In further embodiments, the part-of-speech tagger 144 may tag and/or mark words in the input and/or the input itself to indicate a sentiment of words and/or sentences in the input, an intent of the words and/or sentences in the input, an emotion of words and/or sentences in the input, or any combination thereof. For example, the part-of-speech tagger 144 may tag the words in the input and/or the input itself to indicate that a sentence in the input is creating, reading, updating, and/or deleting (CRUD) any object (e.g. such as an object in a software program), or any other classification. In certain embodiments, the marking and/or tagging of the modified text in the input may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device.

Once the parts of speech of each word and the token in the modified input are tagged/marked, the method 500 may proceed to step 518, which may include replacing, in the tagged part-of-speech text of the modified input, the nounized tokens with the original text that the tokens were utilized to replace to generate a further modified input, which may appear to be visually as the original text in the original input, but with the tags performed in step 516. In certain embodiments, the replacing may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device. At step 520, the method 500 may include analyzing and/or interpreting the part-of-speech tagged text with the replaced tokens (i.e. the text that appears visually the same as the original text, but with tagged text). The analyzing and/or interpreting may include determining concepts and relationships between words, groups of words, letters, sentence, paragraphs, any other word grouping, or any combination thereof. For example, at step 520, the analyzing may include determining the subject, verb, object, prepositions, and other components of a sentence. Additionally, the analyzing of the words in the input may include determining and/or identifying ownership (e.g. possessive), classifications, and/or sequences associated with the words. In certain embodiments, the analyzing and/or interpreting may include posing questions that may be asked of the system 100 and/or of a user (e.g. first user 101). The questions may seek an identification of the subject of a sentence in the input, the verb of a sentence in the input, the object of a sentence in the input, an adjective and/or adverb of a sentence in the input, any other questions, or a combination thereof. The responses to the questions may be enhanced answers, which may be utilized to facilitate the analyzing and determinations made with respect to the input (e.g. increase confidence in determinations, for example). In certain embodiments, the analyzing and/or interpreting may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device. In certain embodiments, steps 520 and 518 may be combined into a single step, or reversed in order. For example, analysis may be performed against a version of the part-of-speech tagged input with the nounization tokens included in the input.

The method 500 may proceed to step 522, which may include scoring, weighting, checking, and/or filtering the analyses and/or interpretations associated with the input. For example, text, sentences, and/or groups of words may be scored both individually or as a group, which may include aggregated various scores for the words within the group. In certain embodiments, the scoring, weighting, checking, and/or filtering may be based on the quality of the interpretations, the sources of the nounizations, and downstream feedback, such as from a hypothesis tester (i.e. software and/or hardware that tests the accuracy of hypotheses generated by the system 100), test generator, discovery module (e.g. static model discovery module 200, model change management module 204, and/or dynamic model discovery module 206), a human evaluator (e.g. first user 101 and/or second user 110), any other criteria, or any combination thereof. In certain embodiments, various filters may be applied to the analyses and and/or interpretations to filter out certain conclusions made by the system 100. For example, the system 100 may filter out conclusions relating to the analyses and interpretations, which do not have high enough scores or confidences, or which fail certain rules of the system 100. In certain embodiments, the scoring, weighting, checking, and/or filtering the analyses and/or interpretations associated with the input may be performed and/or facilitated by utilizing the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device.

In certain embodiments, for step 522, the method 500 may include conducting internal checks, which may validate that confidences are high enough for the analyses and interpretations, and/or that nounized tokens are effectively tagged as nouns by the part-of-speech tagger 144, and/or that verbized tokens are effectively tagged as verbs by the part-of-speech tagger 144, etc. In certain embodiments, in the event either of these tests fails, it may be assumed that other part-of-speech taggings/markings may be inaccurate, and an analysis may be performed by the system 100 to consider rewriting a portion of a sentence of the input to place the tokens into a different location/position within the sentence of the input. In such a case, the method 500 may revert back to step 504 and proceed accordingly. As the method 500 progresses, the rewritten sentences may be fed back to the part-of-speech tagger 144 at step 516 so that the desired parts of speech may be tagged in the rewritten text. In certain embodiments, recursively, the method 500 may include continuing to rewrite the words in the sentence of the input until no more rewrite options are identified or an appropriate tagging/marking is found. In certain embodiments, at step 522, the method 500 may include performing external checks, which may further validate the nounizations and rewritten sentences and any interpretations the system 100 made therefrom. For example, if any of the nounizations, rewritten sentences, and interpretations are not suitable, the method 500 may return to step 504 and analyze whether different sentence (or other word grouping) rewrites/modifications produce the nounizations and rewritten sentences and interpretations that are acceptable and/or desired. External checks may come from downstream systems, such as hypothesis testers, test generators, application under evaluation 230 discovery systems (e.g. static discovery and dynamic discovery systems), and/or any other type of system.

At step 524, the method 500 may include performing various types of learning. For example, in certain embodiments, the system 100 may correlate scoring with concepts or with the number of concepts identified when analyzing the input. The system 100 may update histories and/or confidences in the nounizations identified by the system 100, and may combine similar nounizations, or conversely ensure the separation of nounizations that should not be combined. Learned items may be fed back and used in future nounization scorings performed at step 510 or future scoring and/or filtering at step 522. In certain embodiments, the learning may be facilitating and/or performed by utilizing the learning engine 226, the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device. The method 500 may then proceed to step 526, which may include updating one or more models, such as the agglomerated models 208, based on the analyses, interpretation, learning and/or nounizations, adverbizations, adjectivizations, verbizations, or other part-of-speech associated with words that may be tokenized. For example, the updates may be performed for the LM models 215, the CM models 216, any other model, or any combination thereof. In certain embodiments, the updating may be performed and/or facilitated by utilizing the learning engine 226, the natural language processing engine 143, the part-of-speech tagger 144, the tokenizer 158, the segmenter 159, the static model discovery module 200, the controller 224, the first user device 102, the second user device 111, the server 140, the server 150, the server 160, the communications network 135, any component in FIG. 2, any combination thereof, or by utilizing any other appropriate program, network, system, or device. Notably, the method 500 may further incorporate any of the features and functionality described for the system 100 or as otherwise described herein.

The systems and methods disclosed herein may include additional functionality and features. As indicated above, the system 100 may examine inputs and identify one or more sets of words to be nounized, verbized, adverbized, adjectivized, etc. occurring in the input. For example, in the context of identifying a set of words to be nounized (i.e. words to be replaced by a token and to be treated as a noun by the system 100), the set of words may be identified by one or more sets of capitalized words occurring in the input, sets of nouns or compound nouns, and words adjacent thereof, including other nouns, adjectives, prepositions, pronouns, or any other type of words classification. In certain embodiments, the one or more sets of words to be identified may correspond with a parameter (e.g. a parameter utilized by a software program or other parameter), a concept, an idea, a title, or any other grouping of words. In further embodiments, sets of adjacent nouns, optionally with other relevant words, such as adjectives and/or conjunctions may also be utilized to identify one or more sets of words to be nounized, verbized, adverbized, adjectivized, etc. such as by utilizing taggings from an initial pass from the part-of-speech tagger 144. In further embodiments, the system 100, when identifying one or more sets of words to nounize in an input, may perform a lookup of multiword terms in an information source, such as an external document. The document may be parsed to determine terms of interest. In certain embodiments, the documents may be software manuals, API documents, Swagger documents, release notes, help documents, white papers, any other type of document, or any combination thereof. In certain embodiments, the system 100 may also perform lookups of multiword terms that may be within the application under evaluation 230, such as in the code of the application under evaluation 230, documents supporting the application under evaluation 230, any document associated with the application under evaluation 230, or any combination thereof. Additionally, the system 100 may analyze labels, widgets, page and window titles, help text, help videos, and/or any other accessible artifacts associated with the application under evaluation 230. In still other embodiments, the system 100 may perform lookups of terms that may be in other systems, such as, but not limited to, previously released applications under evaluation 230, accessible systems that are not under test by the system 100, online and/or internet sources, such as Wikipedia™, online journals, online domain knowledge, and other sources.

The systems and methods may also include providing further intelligent processing to facilitate the operations described in the present disclosure. For example, the system 100 may generate multiple possible nounizations (or verbization, etc.) by comparing sets of words to be nounized in an input to historical nounizations determined previously for other inputs to choose a best matching nounization, a fuzzy match, other type of match, or a combination thereof. In certain embodiments, when dealing with multiple nounizations determined for a particular input, the system 100 may generate part-of-speech of altered sentences and consider which verbs each nounization utilizes. The system 100 may then choose a verb, which has a high probability of being accurate and/or correct. This may be based on the domain, historical information, general usage, and/or other factors. In certain embodiments, the system 100 may perform hypothesis testing against a domain to see which nounizations may prove to be the most useful. For example, in an autonomic testing domain, the system 100 may verify which nounizations match to actual objects (e.g. screens, widgets, labels, windows, etc.) in a program, such as the application under evaluation 230.

Notably, the systems and methods may be implemented in the environment as shown in FIG. 2 and in U.S. patent application Ser. No. 15/905,362, filed on Feb. 26, 2018. For example, the functionality provided by the system 100 and/or the method 500 may be implemented as part of either or both of the static model discovery module 200 and/or the dynamic model discovery module 206. In certain embodiments, the system 100 and/or methods 500 may include receiving text, paragraphs, sentences, and/or words to be nounized from internal data sources 201, external data sources 202, and/or the application under evaluation 230. In further embodiments, the system 100 and/or method 500 may include receiving text, paragraphs, sentences, and/or words to be nounized from any of the agglomerated models 208. The text, paragraphs, sentences, and/or words may be standalone in a document, contained within a table, contained within a picture (which may need optical character recognition (OCR) to read), contained within a subset of a larger document, and/or any other such configuration. As with step 526 of the method 500, the systems and methods may output or update any of the agglomerated models 208 with results of the nounization, such as, but not limited to, the CM model 216, the LM model 215, the FSM model 209, and/or any other model. In further embodiments, nounizations may be configured to occur within and/or by utilizing the evaluators 220 and/or the data transformers 232. In still further embodiments, the learning engine 226 may utilize the results of the nounizations alone or in combination with the agglomerated models 208 to determine patterns, histories, probabilities, confidences, and other information associated with nounizations, of likely nounizations, and/or of competing nounizations. In certain embodiments, the learning engine 226 may be configured to provide guidance as to which nounization is most likely in a given context.

In certain embodiments, the systems and methods may include altering an arrangement of words from an input prior to tagging the parts of speech for each word in the input. For example, in certain embodiments, if split infinitives occur in the input (e.g. the split infinitive "to rapidly read"), the arrangement of these words may be rearranged to make it easier for the part-of-speech tagger 143 (or other component of system 100) to tag the parts of speech for each word in the input. In certain embodiments, the systems and methods may include using tokens to replace phrases in inputs that have been determined to have errors, missing text, or a combination thereof. In certain embodiments, tokenization (e.g. adverbization, nounization, verbization, adjectivization, etc.) may result from a first pass of the natural language processing engine 143 (e.g. a noun phrase to be turned into a verbization). If the confidence of the first pass is below a threshold value and/or the system 100 does not understand the noun phrase, the confidence may affect subsequent natural language processing decisions conducted by the system 100 so that tokenizations are conducted more efficiently in the future. In certain embodiments, a token from a first recursion may appear as a word that may be pulled into a token generated and/or used at a later time as part of the recursion. In certain embodiments, tokens may be simple tokens, however, in other embodiments, tokens may be complex and may include metadata that may keep track of statistics (e.g. usage of token, words the token replaces, how often the token is used, what type of tokenization the token is used for, if the token is ever inaccurate, confidence levels for the token, etc.) associated with the token, an identification of how and where the token has been used, a number of times the token has been used, etc. In certain embodiments, the token may be a complex object that may be passed through the natural language processing engine 143, which may process the metadata separately from the token itself to understand more about the token. In certain embodiments, subsets or supersets of words may include a token as well. In certain embodiments, the systems and methods may generate multiple possible tokenizations, and the system 100 may be configured to choose a tokenization based on its score, metadata, or any combination thereof.

The systems and methods disclosed herein may include further functionality and features. For example, the operative functions of the system 100 and method 500 may be configured to execute on a special-purpose processor specifically configured to carry out the operations provided by the system 100 and method 500. Notably, the operative features and functionality provided by the system 100 and method 500 may increase the efficiency of computing devices that are being utilized to facilitate the functionality provided by the system 100 and method 500. For example, the system 100 and method 500 can optimize the performance of future actions through machine learning, such that a reduced amount of computer operations need to be performed by the devices in the system 100 using the processors and memories of the system 100 than in systems that are not capable of machine learning as described in this disclosure. In such a context, less processing power may need to be utilized because the processors and memories do not need to perform actions, operations, and analyses that have already been conducted by the system 100. In certain embodiments, the system 100 may learn that certain state(s) associated with and/or from discovery and/or testing may be faster on certain processing hardware. For example, for a state with complex mathematical operations and/or graphics, the system 100 may perform better when there is a floating point processor or a graphics processing unit. As another example, when compared to traditional part of speech solutions, the tokenization provided by the system 100 reduces computing costs, as measured by central processing unit (CPU) cycles, memory usage, and network bandwidth. In certain embodiments, the system 100 accomplishes such reductions in computing costs by reducing sentence length of sentences included in inputs analyzed by the system 100, complexity, and word combinations having grammar that must be evaluated for correctness and likelihood. Additionally, in certain embodiments, the system 100 resources are used more efficiently because the system 100 is not attempting to process inaccurate or misleading relations from complex language (e.g. English) that may be present without the functionality provided by the system 100, and is only processing accurate and improved relations using the system 100. As a result, the functionality provided by the system 100 and method 500 may provide substantial savings in the usage of computer resources by utilizing the software and functionality provided in the present disclosure.

Notably, in certain embodiments, various functions and features of the system 100 and methods may operate without human intervention and may be conducted entirely by computing devices, robots, programs, and/or processes. For example, in certain embodiments, multiple computing devices may interact with devices of the system 100 to provide the functionality supported by the system 100. Additionally, in certain embodiments, system 100 may operate continuously to reduce the possibility of defects, conflicts, and/or errors from being introduced into the system 100 and/or the application under evaluation 230. In certain embodiments, the system 100 and methods may also provide effective computing resource management by utilizing the features and functions described in the present disclosure. For example, in certain embodiments, the system 100 may specify a quantity of computer processor resources (e.g. processor clock cycles, processor speed, processor cache, etc.) that may be dedicated to receiving inputs from one or more sources; identifying one or more sets of words in the inputs that correspond to a particular parameter, concept and/or idea (e.g. nounizations, verbizations, adjectivizations, and adverbizations); generating tokens to replace the one or more sets of identified words; scoring the words and/or tokens; replacing the sets of identified words with tokens; passing the inputs to the part of speech tagger 144 to tag parts of speech of each word and token in the inputs; replacing tokens with the original text that tokens were utilized to replace; analyzing the inputs to generate analyses and interpretations; scoring, weighing, checking and/or filtering the analyses and/or interpretations; performing learning based on information obtained from the analyses and/or interpretations; updating one or more models utilized by the system based on the analyses, interpretations and/or learning performed by the system 100; and performing any other operations conducted by the system 100, or any combination thereof. As another example, the system 100 may indicate a quantity of processor cycles of a processor that may be utilized to obtain data, process obtained data, and/or specify a selected amount of processing power that may be dedicated to evaluating the application under evaluation 230 or conducting the static and dynamic model discovery.

In certain embodiments, any device or program in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and method 500 at time periods when usage of processing resources and/or memory resources in the system 100 is at a selected and/or threshold value. In certain embodiments, the system 100 and methods may include transmitting signals to the memory devices utilized in the system 100, which indicate which specific portions (e.g. memory sectors, etc.) of the memory should be utilized to store any of the data utilized or generated by the system 100. For example, a signal may be transmitted to the memory devices indicating which portions of the memories should be dedicated to storing tokens, identified sets of words from inputs, analyses and interpretations generated by the system 100, scores for analyses, interpretations, tokens and/or sets of words, updates for the agglomerated models 208, any other information stored by the system 100, or a combination thereof. Notably, the signals transmitted to the processors and memories may be utilized to optimize the usage of computing resources while executing the operations conducted by the system 100. As a result, such features provide substantial operational efficiencies and improvements over existing technologies.

Figure 6:
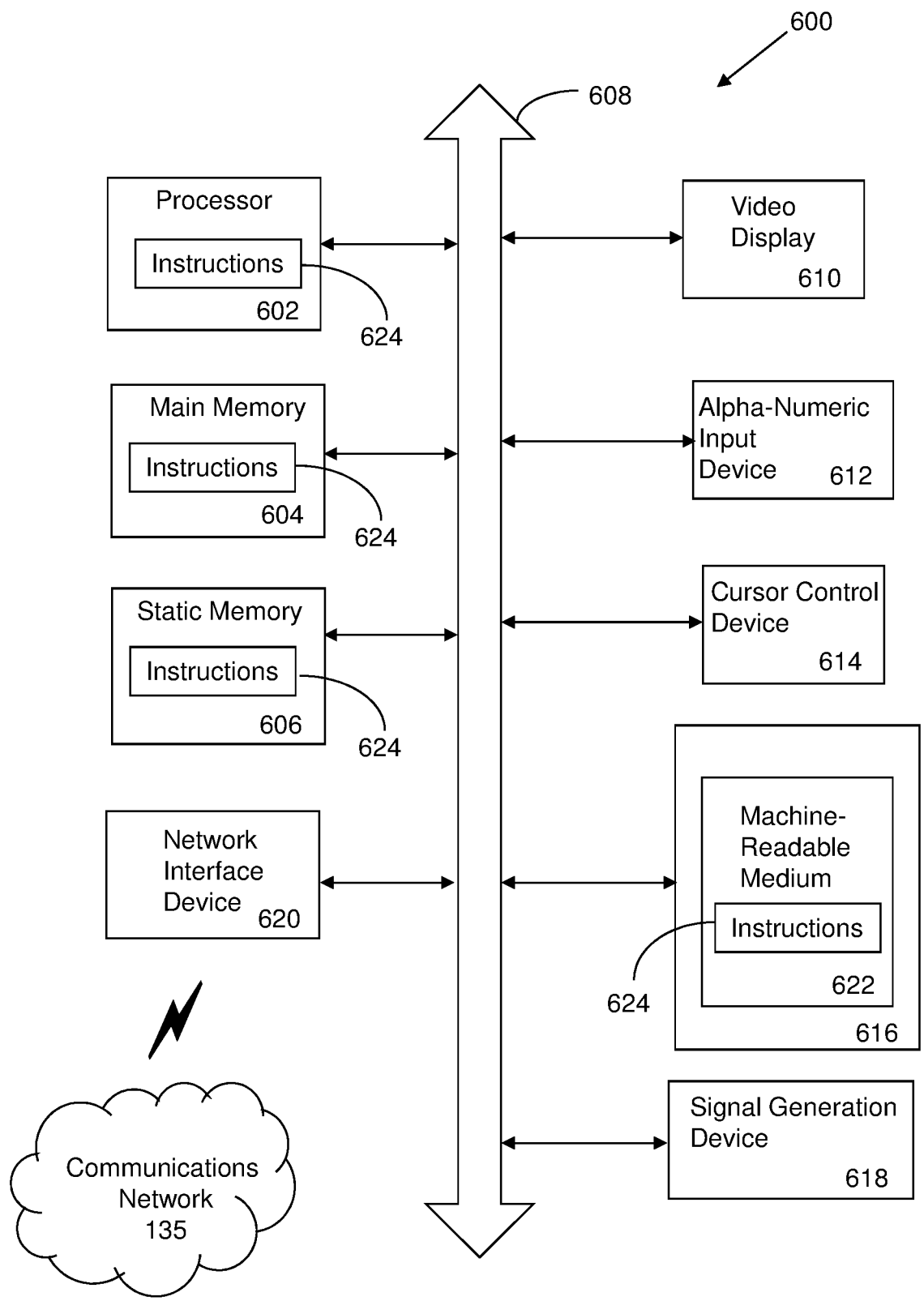
FIG. 6 is a schematic diagram of a machine in the form of a computer system within which a set of instructions, when executed, may cause the machine to perform any one or more of the methodologies or operations of the systems and methods for providing intelligent part of speech processing of complex natural language.

Referring now also to FIG. 6, at least a portion of the methodologies and techniques described with respect to the exemplary embodiments of the system 100 can incorporate a machine, such as, but not limited to, computer system 600, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the natural language processing engine 143, the part of speech tagger 144, the server 150, the database 155, the tokenizer 158, the segmenter 159, the server 160, or any combination thereof. The machine may assist with operations performed by the static model discovery module 200, the model change management module 204, the dynamic module discovery module 206, the controller 224, the learning engine 226, evaluators 220, the application under evaluation 230, the data transformers 232, any other component in the system, any programs in the system, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU, or both)), a main memory 604 and a static memory 606, which communicate with each other via a bus 608. The computer system 600 may further include a video display unit 610, which may be, but is not limited to, a liquid crystal display (LCD), a flat panel, a solid state display, or a cathode ray tube (CRT). The computer system 600 may include an input device 612, such as, but not limited to, a keyboard, a cursor control device 614, such as, but not limited to, a mouse, a disk drive unit 616, a signal generation device 618, such as, but not limited to, a speaker or remote control, and a network interface device 620.

The disk drive unit 616 may include a machine-readable medium 622 on which is stored one or more sets of instructions 624, such as, but not limited to, software embodying any one or more of the methodologies or functions described herein, including those methods illustrated above. The instructions 624 may also reside, completely or at least partially, within the main memory 604, the static memory 606, or within the processor 602, or a combination thereof, during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 622 containing instructions 624 so that a device connected to the communications network 135, another network, or a combination thereof, can send or receive voice, video or data, and communicate over the communications network 135, another network, or a combination thereof, using the instructions. The instructions 624 may further be transmitted or received over the communications network 135, another network, or a combination thereof, via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure is not limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system for providing intelligent part of speech processing of complex natural language, comprising:
   a memory that stores instructions; and
   a processor that executes the instructions to cause the processor to be configured to:
      identify one or more non-text items in an input, wherein the non-text items correspond to an emoji, a GIF, an emoticon, video content, audio content, media content, or a combination thereof;
      generate a first modified input, by replacing at least a portion of the identified non-text items in the input with one or more tokens that correspond to the replaced portion of the identified non-text items;
      tag parts-of-speech for each non-text item and the one or more tokens in the first modified input to generate tagged part-of-speech text for the first modified input, wherein tagging comprises:
         determining the parts-of-speech for each non-text item and the one or more tokens, using a series of semantic libraries, wherein each semantic library is a repository comprising media content and information comprising relationships and associations between concepts, keywords, words, content, and their meanings; and
         determining whether the non-text items match and/or correlate with an initial set of concepts, keywords, content, terms, and/or identifiers in at least one of the semantic libraries;
      replace, in the tagged part-of-speech text for the first modified input, the one or more tokens with the non-text items originally identified in the input to generate a second modified input;
      update at least one agglomerated machine learning model utilized by the system based on analyzing the tagged part-of-speech text of the second modified input; and
      generate at least one analysis or interpretation associated with the input using the updated at least one agglomerated model.

2. The system of claim 1, wherein the processor is further configured to receive the input from a source.

3. The system of claim 1, wherein the identified non-text items describe a concept, an idea, title, grouping, or a combination thereof.

4. The system of claim 1, wherein the token may be constructed by the system to appear as a selected or desired part of speech to the tagger.

5. The system of claim 1, wherein the processor is further configured to generate the token based on a word, a phrase, a concept, or a combination thereof, associated with the portion of the non-text items.

6. The system of claim 1, wherein the processor is further configured to construct the token to appear as a noun, adverb, verb, other part of speech, or a combination thereof, associated with the portion of the non-text items.

7. The system of claim 1, wherein the processor is further configured to select the token for the portion of the non-text items from a set of candidate tokens based on the token having a highest correlation or confidence associated with the portion of the non-text items.

8. The system of claim 1, wherein the processor is further configured to determine at least one relationship between words, groups of word, letters, sentences, paragraphs, or a combination thereof, for the portion of the non-text items based on analysing the second modified input.

9. The system of claim 8, wherein the processor is further configured to score, weight, check, or filter the at least one relationship based on an interpretation, downstream feedback, sources associated with the input, or a combination thereof.

10. The system of claim 9, wherein the processor is further configured to utilize the score, the weight, or the filter to facilitate learning for the at least one agglomerated model facilitating operation of the system, the tagger, or a combination thereof.

11. The system of claim 10, wherein the processor is further configured to update the at least one agglomerated model, the tagger, or a combination thereof, to enhance a future interpretation, analysis, or a combination thereof, for new content from a new input to the system.

12. The system of claim 1, wherein the token is tagged by the tagger according to a selected or desired part of speech.

13. The system of claim 1, wherein the at least one agglomerated model comprises at least one of: a finite state model (FSM) model, linear temporal logic model (LTL) model, an entity relationship/database (ER-DB) model, activity (AC) model, a conceptual model (CM) model, n-Dimensional physical (nD) model, mathematical models (MS), or a learning model (LM) model.

14. The system of claim 1, wherein the processor is further configured to identify a word or phrase that modifies or qualifies an adjective, verb, adverb, or a combination thereof, to replace with the token.

15. The system of claim 1, wherein the system is further configured to perform the tagging by evaluating the initial set of concepts, keywords, content, terms, and/or identifiers using a graph database in order to determine whether additional concepts, keywords, content, terms, and/or identifiers match or correlate with the non-text items.

16. A method for providing intelligent part of speech processing of complex natural language, comprising:
    identifying one or more non-text items in an input, wherein the non-text items correspond to an emoji, a GIF, an emoticon, video content, audio content, media content, or a combination thereof;
    generating a first modified input, by replacing, utilizing instructions from a memory that are executed by a processor, at least a portion of the identified non-text items in the input with one or more tokens that correspond to the replaced portion of the identified non-text items;
    tagging, utilizing a tagger and the instructions from the memory that are executed by the processor, parts-of-speech for each non-text item and the one or more tokens in the first modified input to generate tagged part-of-speech text for the first modified input, wherein tagging comprises:
        determining the parts-of-speech for each non-text item and the one or more tokens, using a series of semantic libraries, wherein each semantic library is a repository comprising media content and information comprising relationships and associations between concepts, keywords, words, content, and their meanings; and
        determining whether the non-text items match and/or correlate with an initial set of concepts, keywords, content, terms, and/or identifiers in at least one of the semantic libraries;
    replacing, in the tagged part-of-speech text for the first modified input, utilizing the instructions from the memory that are executed by the processor, the one or more tokens with the non-text items originally identified in the input to generate a second modified input; and
    updating at least one agglomerated model utilized by the method based on analysing the tagged part-of-speech text of the second modified input; and
    generating at least one analysis or interpretation associated with the input using the updated at least one agglomerated machine learning model.

17. The method of claim 16, wherein the identified non-text items describe a concept, idea, title, grouping, or a combination thereof.

18. The method of claim 16, further comprising:
    detecting a missing concept, word, idea, or a combination thereof, from the input; and
    replacing the missing concept, word, idea, or a combination thereof, with the token.

19. The method of claim 16, further comprising identifying an intent associated with the input based on extracting a context associated with the portion of the non-text items, words in the portion of the non-text items, relationships between words in the portion of the non-text items, or a combination thereof.

20. The method of claim 16, further comprising determining an accuracy associated with the tagging of at least one part of speech, the token, or a combination thereof.

21. A non-transitory computer-readable device comprising instructions, which, when loaded and executed by a processor, cause the processor to perform operations for providing intelligent part of speech processing of complex natural language, comprising:
    identify one or more non-text items in an input, wherein the non-text items correspond to an emoji, a GIF, an emoticon, video content, audio content, media content, or a combination thereof;
    generating a first modified input, by replacing at least a portion of the identified non-text items in the input with one or more tokens that correspond to the replaced portion of the identified non-text items;
    tagging, utilizing a tagger, parts-of-speech for each non-text item and the one or more tokens in the first modified input to generate tagged part-of-speech text for the first modified input, wherein tagging comprises:
        determining the parts-of-speech for each non-text item and the one or more tokens, using a series of semantic libraries, wherein each semantic library is a repository comprising media content and information comprising relationships and associations between concepts, keywords, words, content, and their meanings; and
        determining whether the non-text items match and/or correlate with an initial set of concepts, keywords, content, terms, and/or identifiers in at least one of the semantic libraries;
    replacing, in the tagged part-of-speech text for the first modified input, the one or more tokens with the non-text items originally identified in the input to generate a second modified input;
    updating at least one agglomerated machine learning model utilized by the system based on analyzing the tagged part-of-speech text of the second modified input; and
    generating at least one analysis or interpretation associated with the input using the updated at least one agglomerated model.

* * * * *